United States Patent
Sakata et al.

(10) Patent No.: US 9,219,650 B2
(45) Date of Patent: Dec. 22, 2015

(54) NETWORK MANAGEMENT APPARATUS, NETWORK MANAGEMENT METHOD, AND NETWORK MANAGEMENT SYSTEM

(75) Inventors: Masayuki Sakata, Tokyo (JP); Yukio Ogawa, Tokyo (JP); Sayuri Kaneko, Tokyo (JP); Kosuke Kaneko, Tokyo (JP); Toshihiko Murakami, Tokyo (JP); Yusuke Nishi, Tokyo (JP); Osamu Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 206 days.

(21) Appl. No.: 14/003,315

(22) PCT Filed: Mar. 7, 2011

(86) PCT No.: PCT/JP2011/001314
§ 371 (c)(1),
(2), (4) Date: Nov. 12, 2013

(87) PCT Pub. No.: WO2012/120557
PCT Pub. Date: Sep. 13, 2012

(65) Prior Publication Data
US 2014/0064056 A1 Mar. 6, 2014

(51) Int. Cl.
H04L 12/24 (2006.01)
H04L 12/707 (2013.01)

(52) U.S. Cl.
CPC .......... *H04L 41/0816* (2013.01); *H04L 41/00* (2013.01); *H04L 41/065* (2013.01); *H04L 45/24* (2013.01)

(58) Field of Classification Search
None
See application file for complete search history.

(56) References Cited

U.S. PATENT DOCUMENTS 6,888,797 B1 5/2005 Cao et al.

FOREIGN PATENT DOCUMENTS

JP 2005-318222 A 11/2005

OTHER PUBLICATIONS

PCT International Search Report on application PCT/JP2011/001314 mailed Apr. 5, 2011; 1 page.

*Primary Examiner* — Diane Lo
(74) *Attorney, Agent, or Firm* — Foley & Lardner LLP

(57) ABSTRACT

A network management apparatus is designed so that when reassigning the existing address, the network management apparatus extracts a link with the largest link cost from among links comprising the network based on the network configuration information and specifies a flow routed though the extracted link based on the statistic information; when receiving a path change request and a via link request to request a via link with respect to the specified flow from an external terminal, the network management apparatus selects either one of addresses of an address pair of the specified flow as a change target address; and when changing the selected change target address, the network management apparatus changes the change target address to a candidate address to be assigned by selecting an address, which is routed through a link included in the via link request and has not been assigned, as the candidate address to be assigned.

15 Claims, 19 Drawing Sheets

| Device ID | Device Type | Rack ID | MAC Address | Connected Switch ID |
|---|---|---|---|---|
| server001 | server | rack001 | 01:23:45:00:00:07 | switch001 |
| server002 | server | rack001 | 01:23:45:00:00:08 | switch002 |
| storage001 | storage | rack001 | 01:23:45:00:00:09 | switch001 |
| storage002 | storage | rack001 | 01:23:45:00:00:10 | switch002 |
| switch001 | switch | rack001 | - | - |
| server003 | server | rack002 | .... | .... |
| server004 | server | rack002 | .... | .... |
| storage003 | storage | rack002 | .... | .... |
| storage004 | storage | rack002 | .... | .... |
| switch002 | switch | rack002 | - | - |

| Virtual Machine ID | Server ID | Virtual Machine Exection Module ID | Virtual Machine Management Address | Virtual NIC | Assigned MAC Address | Connected Switch ID |
|---|---|---|---|---|---|---|
| vm001 | server001 | hy001 | 192.168.0.101 | eth0 | 01:23:45:00:00:01 | switch001 |
| vm002 | server001 | hy001 | 192.168.0.101 | eth0 | 01:23:45:00:00:02 | switch001 |
| vm003 | server002 | hy002 | 192.168.0.102 | eth0 | 01:23:45:00:00:03 | switch001 |
| vm004 | server003 | hy003 | 192.168.0.103 | eth0 | 01:23:45:00:00:04 | switch002 |
| vm005 | server003 | hy003 | 192.168.0.103 | eth0 | 01:23:45:00:00:05 | switch002 |
| vm006 | server004 | hy004 | 192.168.0.104 | eth0 | 01:23:45:00:00:06 | switch002 |
| 322A | 322B | 322C | 322D | 322E | 322F | 322G |

| Link ID | Source Switch ID | Destination Switch ID | Link Bandwidth [Gbps] | Link Cost | Average Transmission Amount [Gbps] | Average Reception Amount [Gbps] |
|---|---|---|---|---|---|---|
| link001 | switch001 | switch010 | 10 | 10 | 9.0 | 9.0 |
| link002 | switch001 | switch020 | 10 | 10 | 2.0 | 2.0 |
| link003 | switch001 | switch030 | 10 | 10 | 1.0 | 1.0 |
| link004 | switch002 | switch010 | 10 | 10 | 9.0 | 9.0 |
| link005 | switch002 | switch020 | 10 | 10 | 2.0 | 2.0 |
| link006 | switch002 | switch030 | 10 | 10 | 1.0 | 1.0 |

Fig.7

| Flow ID | Source MAC Address | Destination MAC Address | Average Transmission Amount [Gbps] | Average Reception Amount [Gbps] | Via Link ID |
|---|---|---|---|---|---|
| f001 | 01:23:45:00:00:01 | 01:23:45:00:00:05 | 5.0 | 3.0 | link001, link004 |
| f002 | 01:23:45:00:00:02 | 01:23:45:00:00:04 | 1.0 | 1.0 | link003, link006 |
| f003 | 01:23:45:00:00:02 | 01:23:45:00:00:05 | 4.0 | 6.0 | link001, link004 |
| f004 | 01:23:45:00:00:04 | 01:23:45:00:00:01 | 1.0 | 1.0 | link002, link005 |
| f005 | 01:23:45:00:00:03 | 01:23:45:00:00:06 | 1.0 | 1.0 | link002, link005 |
| f006 | 01:23:45:00:00:06 | 01:23:45:00:00:05 | 1.0 | 0.5 | - |

| Virtual Machine ID | Average CPU Usage Rate | CPU Threshold | Average Memory Usage Rate | Memory Threshold | Automatic Virtual Machine Increase/Decrease Possibility |
|---|---|---|---|---|---|
| vm001 | 80 | 70 | 20 | 70 | Possible |
| vm002 | 10 | 70 | 10 | 70 | Impossible |
| vm003 | 20 | 70 | 25 | 70 | Possible |
| vm004 | 10 | 70 | 20 | 70 | Impossible |
| vm005 | 20 | 70 | 15 | 70 | Impossible |
| vm006 | 20 | 70 | 10 | 70 | Impossible |
| 326A | 326B | 326C | 326D | 326E | 326F |

| Server ID | Virtual Machine ID | VM Virtual HBA/WWPN | Storage ID | LV ID | LV Virtual HBA/WWPN |
|---|---|---|---|---|---|
| server001 | vm001 | 10:00:00:00:00:00:00:aa:01 | storage001 | lv001 | 10:00:00:00:00:00:00:ab:01 |
| server001 | vm002 | 10:00:00:00:00:00:00:aa:02 | storage003 | lv002 | 10:00:00:00:00:00:00:ab:02 |
| server002 | vm003 | 10:00:00:00:00:00:00:aa:03 | storage001 | lv003 | 10:00:00:00:00:00:00:ab:03 |
| server003 | vm004 | 10:00:00:00:00:00:00:aa:04 | storage003 | lv004 | 10:00:00:00:00:00:00:ab:04 |
| server003 | vm005 | 10:00:00:00:00:00:00:aa:05 | storage002 | lv005 | 10:00:00:00:00:00:00:ab:05 |
| server004 | vm006 | 10:00:00:00:00:00:00:aa:06 | storage004 | lv006 | 10:00:00:00:00:00:00:ab:06 |
|  |  |  |  |  |  |
| 327A | 327B | 327C | 327D | 327E | 327F |

Fig.18

| FDF Switch ID | WWPN | FCID |
|---|---|---|
| switch001 | 10:00:00:00:00:00:aa:01 | 00:00:01 |
| switch001 | 10:00:00:00:00:00:aa:02 | 00:00:02 |
| switch001 | 10:00:00:00:00:00:aa:03 | 00:00:03 |
| switch002 | 10:00:00:00:00:00:aa:04 | 01:00:01 |
| switch002 | 10:00:00:00:00:00:aa:05 | 01:00:02 |
| switch002 | 10:00:00:00:00:00:aa:06 | 01:00:03 |
| switch001 | 10:00:00:00:00:00:ab:01 | 00:01:01 |
| switch001 | 10:00:00:00:00:00:ab:02 | 00:01:02 |
| switch001 | 10:00:00:00:00:00:ab:03 | 00:01:03 |
| switch002 | 10:00:00:00:00:00:ab:04 | 01:01:01 |
| switch002 | 10:00:00:00:00:00:ab:05 | 01:01:02 |
| switch002 | 10:00:00:00:00:00:ab:06 | 01:01:03 |
|  |  |  |

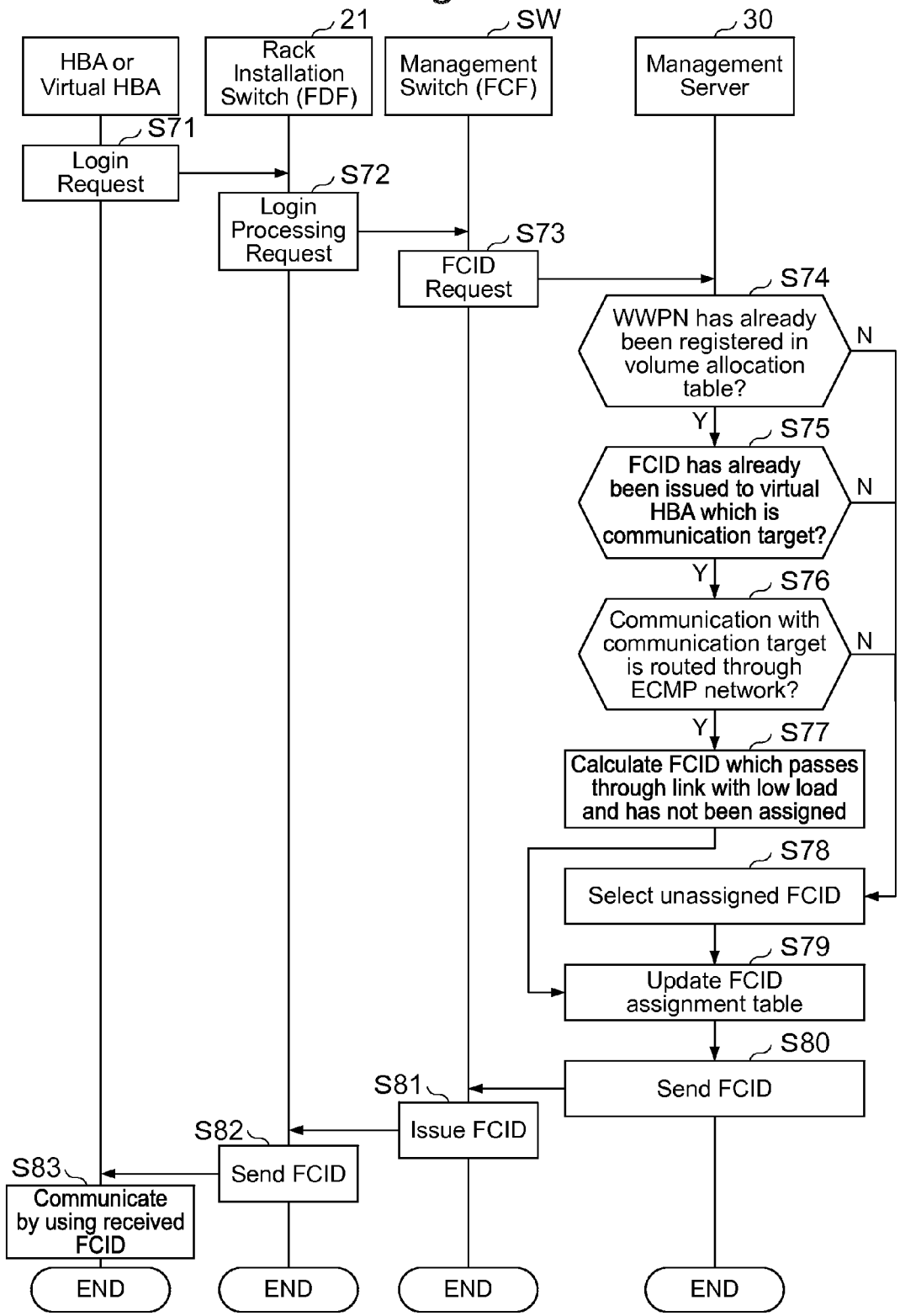

NETWORK MANAGEMENT APPARATUS, NETWORK MANAGEMENT METHOD, AND NETWORK MANAGEMENT SYSTEM

TECHNICAL FIELD

The present invention relates to a network management apparatus, method, and system. Particularly, the invention is suited for use in a network management apparatus, method, and system for controlling packet transfer paths.

BACKGROUND ART

Conventionally, a transfer technique called a "multipath" has been known as a technique to improve use efficiency of a network. If this multipath is used, for example, a plurality of transfer paths (paths) can be used at the same time when transferring packets; and, therefore, loads in the network can be distributed. Furthermore, there is a known transfer technique using a plurality of shortest paths at the same time by combining the above-described multipath technique and a technique calculating and selecting the shortest paths from among a plurality of paths. This transfer technique using the plurality of shortest paths at the same time is particularly called "ECMP" (Equal Cost Multi-Path) among multipaths.

Meanwhile, since the plurality of paths are used at the same time as described above in the network environment which utilizes the multipaths or the ECMP, it is necessary to appropriately decide a path to be actually used from among a plurality of available paths. If the decided path is inappropriate, the transfer order of packets transferred from a source to a destination may be replaced with the order of arrival of packets which actually arrived at the destination, thereby causing a problem. This happens in a case, for example, where when it is intended to transfer packets A and B from the source to the destination in the order of packet A and then packet B and make them arrive at the destination in the order of packet A and then packet B and although packet A should be transferred through path A and packet B should be transferred through path B, packet A is transferred through path B and packet B is transferred through path A; and as a result, the order of arrival at the destination becomes packet B and then packet A.

Then, Patent Literature 1 discloses a technique that decides a path to be actually used from among a plurality of available paths based on a pair of a source address and a destination address (address pair). This address pair is, for example, a pair of a MAC address of a source (Source MAC address) and a MAC address of a destination (Destination MAC Address). In fact, when a network device such as a switch or a router receives a packet from the source, it calculates a hash value of the address pair included in a header of this packet and decides a path to be actually used based on the calculation result. Incidentally, there is a technique that decides the path to be actually used, based only on the address of the source.

Then, if this technique described in Patent Literature 1 is used, it is possible to solve the above-described problem of replacement of the order of packets transferred from the source with the order of packets which have actually arrived at the destination.

CITATION LIST

Patent Literature

[Patent Literature 1] U.S. Pat. No. 6,888,797 A1

SUMMARY OF INVENTION

Problems to be Solved by the Invention

Meanwhile, the technique described in Patent Literature 1 is to select a path to be actually used from among a plurality of available paths based on the address pair; however, while it is possible to use paths dispersively in terms of probability, in some cases biased communication may actually occurs in a certain path.

For example, when a large amount of data is sent and received between communication terminals, which form a specific address pair, and communication (flow) between this address pair of the communication terminals is routed through a specific path, and if a flow between other communication terminals is selected to be routed through the path for sending and receiving the large amount of data, biased communication occurs at the specific path. Then, as a result, there is a possibility that communication failures such as convergence or loss of packets (packet loss) may happen.

Moreover, the technique described in Patent Literature 1 uses hardware resources such as ASIC (Application Specific Integrated Circuit) in order to implement high-speed packet transfer processing. So, when the above-described biased communication occurs, it is difficult to flexibly change a hash value calculation formula for the address pair according to the bias. Specifically speaking, even though another optimum path is not in use, the path which has been selected once will be used continuously.

Furthermore, since a plurality of paths are used at the same time as described above under the network environment which uses multipath, upon the occurrence of a communication failure at a specific path, which flow between which communication terminals is affected by the communication failure by suffering, for example, packet loss cannot be identified promptly.

The present invention was devised in consideration of the above-described points and suggests a network management apparatus, method, and system capable of implementing high-speed load distribution processing in a network environment which utilizes multipaths, improving network use efficiency, and further promptly identifying an area of influence at the time of a communication failure.

Means for Solving the Problems

In order to solve the above-described problems, a network management apparatus in a network of multipath configured for communication between servers, between storage apparatuses, or between a server and a storage apparatus is provided according to the present invention and the network management apparatus controls a packet transfer path when transferring a packet to a virtual machine operating in the server or a logical volume operating in the storage apparatus by using the multipath, wherein the network management apparatus comprises: an acquisition part for acquiring network configuration information to manage a status of use of the network and statistic information to manage statistic information about packets flowing over the network; and a control part for reassigning an existing address, which is already assigned to the virtual machine or the logical volume, based on the network configuration information and the statistic information acquired by the acquisition part, wherein when reassigning the existing address, the control part extracts a link with the largest link cost from among links comprising the network based on the network configuration information and identifies a flow routed though the extracted link based on the statistic information; when receiving a path change request and a via link request to request a via link with respect to the specified flow from an external terminal, the control part selects either one of addresses of an address pair of the specified flow as a change target address; and when changing the selected change target address, the control part changes the change target address to a candidate address to be assigned by selecting an address, which is routed through a link included in the via link request and has not been assigned, as the candidate address to be assigned.

Furthermore, a network management method for a network management apparatus in a network of multipath configured for communication between servers, between storage apparatuses, or between a server and a storage apparatus is provided according to the present invention and the network management apparatus controls a packet transfer path when transferring a packet to a virtual machine operating in the server or a logical volume operating in the storage apparatus by using the multipath, wherein the network management apparatus comprises: an acquisition part for acquiring network configuration information to manage a status of use of the network and statistic information to manage statistic information about packets flowing over the network; and a control part for reassigning an existing address, which is already assigned to the virtual machine or the logical volume, based on the network configuration information and the statistic information acquired by the acquisition part, wherein the network management method comprises: a first step executed, when reassigning the existing address, by the control part extracting a link with the largest link cost from among links comprising the network based on the network configuration information; a second step executed by the control part identifying a flow routed though the extracted link based on the statistic information; a third step executed, when receiving a path change request and a via link request to request a via link with respect to the specified flow from an external terminal, by the control part selecting either one of addresses of an address pair of the specified flow as a change target address; a fourth step executed, when changing the selected change target address, by the control part selecting an address, which is routed through a link included in the via link request and has not been assigned, as a candidate address to be assigned; and a fifth step executed by the control part changing the change target address to the candidate to be assigned.

Furthermore, a network management system in a network of multipath configured for communication between servers, between storage apparatuses, or between a server and a storage apparatus is provided according to the present invention and the network management system controls a packet transfer path when transferring a packet to a virtual machine operating in the server or a logical volume operating in the storage apparatus by using the multipath, wherein the network management system comprises: an acquisition part for acquiring network configuration information to manage a status of use of the network and statistic information to manage statistic information about packets flowing over the network; and a control part for reassigning an existing address, which is already assigned to the virtual machine or the logical volume, based on the network configuration information and the statistic information acquired by the acquisition part, wherein when reassigning the existing address, the control part extracts a link with the largest link cost from among links comprising the network based on the network configuration information and identifies a flow routed though the extracted link based on the statistic information; when receiving a path change request and a via link request to request a via link with respect to the specified flow from an external terminal, the control part selects either one of addresses of an address pair of the specified flow as a change target address; and when changing the selected change target address, the control part changes the change target address to a candidate address to be assigned by selecting an address, which is routed through a link included in the via link request and has not been assigned, as the candidate address to be assigned.

Advantageous Effects of Invention

According to the present invention, it is possible to implement high-speed load distribution processing in a network environment which utilizes multipaths, improve network use efficiency, and further promptly identify an area of influence upon the occurrence of a communication failure.

BRIEF DESCRIPTION OF DRAWINGS

FIG. 4 is a conceptual diagram of a configuration information table.

FIG. 5 is a conceptual diagram of a virtual machine information table.

FIG. 6 is a conceptual diagram of a network topology table.

FIG. 7 is a conceptual diagram of a statistic information table.

FIG. 10 is a conceptual diagram of a virtual machine operation information table.

FIG. 17 is a conceptual diagram of a volume allocation table.

FIG. 18 is a conceptual diagram of an FCID assignment table.

FIG. 19 is a flowchart illustrating a processing sequence of FCID issuance processing.

DESCRIPTION OF EMBODIMENTS

An embodiment of the present invention will be described in detail with reference to the attached drawings.

(1) First Embodiment (1-1) Configuration of Network Management System

Figure 1:
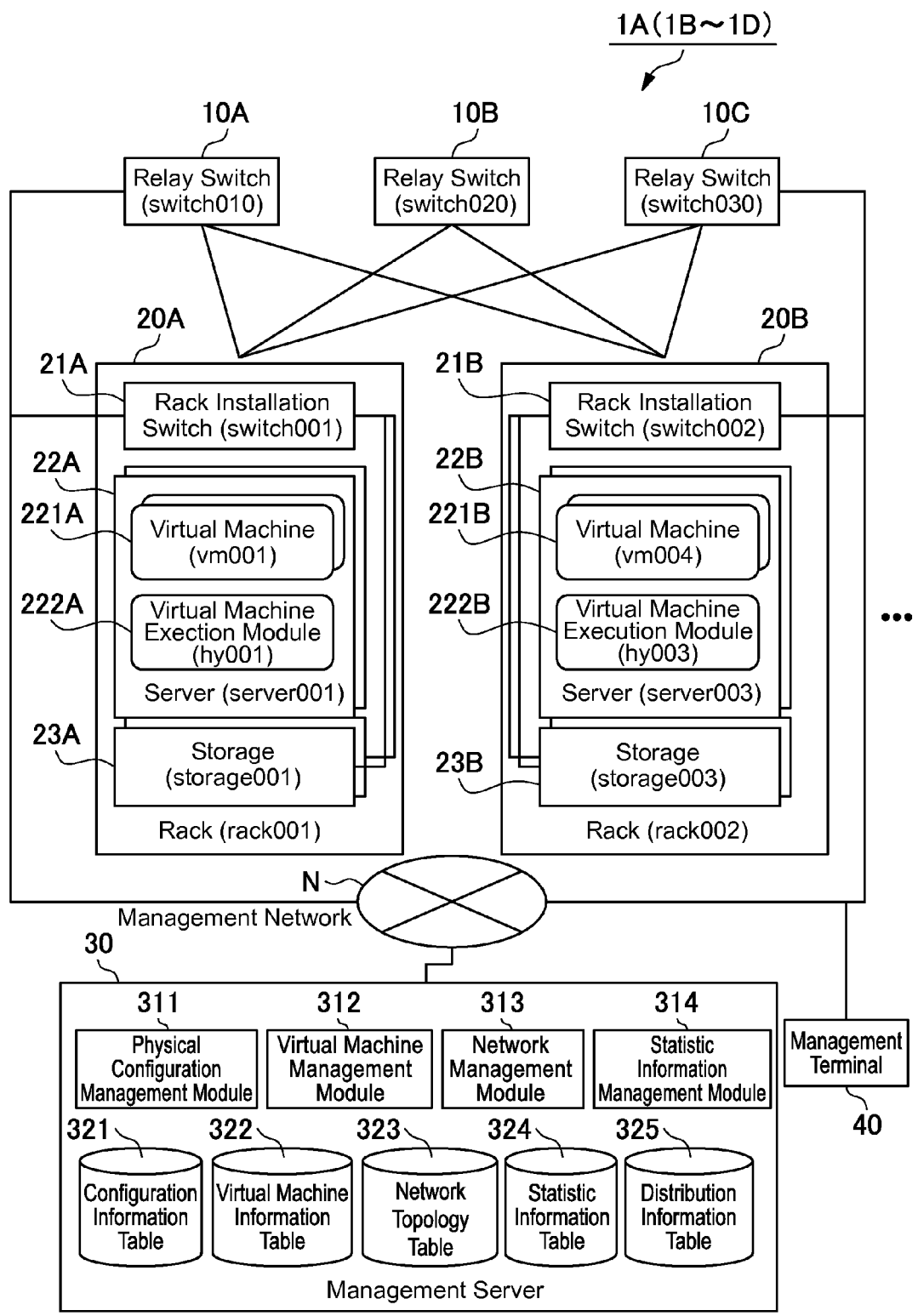
FIG. 1 is a schematic logical configuration diagram of a network management system.

FIG. 1 illustrates a schematic logical configuration of a network management system 1A. This network management system 1A includes relay switches 10A to 10C, racks 20A and 20B, a management server 30, and a management terminal 40.

Incidentally, this network management system 1A comprises three relay switches 10A to 10C, two racks 20A and 20B, one management server 30, and one management terminal 40; however, the number of such elements according to the present invention is not limited to this example. Moreover, if the relay switches are not particularly distinguished one from another in the following explanation, they will be described as the "relay switch 10"; and if the racks 20A and 20B are not particularly distinguished one from the other, they will be described as the "rack 20."

The relay switches 10A to 10C are transfer switches for transferring packets when the packets are transferred between the racks 20A and 20B. Each relay switch 10A to 10C is connected to the racks 20A and 20B and any one or all of the relay switches 10A to 10C are connected to a management network N. Then, the relay switches 10A to 10C constitute a plurality of paths (multipaths) for communication between the racks 20A and 20B and any of these multipaths constitutes a path with equal cost (ECMP: Equal Cost Multi-Path).

Incidentally, a "path" herein used means a communication path from a certain device to a certain device. For example, a communication path (path) from the server 22A to the server 22B will be routed through a plurality of links and network devices.

The rack 20A comprises a rack installation switch 21A, a server 22A, and a storage apparatus 23A. Incidentally, the rack 20A in this example comprises the server 22A and the storage apparatus 23A; however, the invention is not necessarily limited to this example, and the rack 20A may comprise, for example, only the server 22A or only the storage apparatus 23A.

The rack installation switch 21A sends and receives packets between the racks 20A and 20B via any one of the relay switches 10A to 10C or all the relay switches 10A to 10C. The rack installation switch 21A is connected to the relay switches 10A to 10C and also to the management network N.

A connection (link) between the rack installation switch 21A and the relay switches 10A to 10C may be established by a single cable or a plurality of cables. If the plurality of cables are used to connect them, a plurality of links are connected as logically one link by means of, for example, link aggregation (LAG: Link AggreGation) which is an already known technique (see FIG. 3).

Incidentally, a "link" herein used means a link (or connection) between an NIC (Network Interface Card) and a network device or between network devices. For example, the link means a connection (or link) between devices linked (or connected) via cables in accordance with IEEE802.3.

The server 22A comprises a virtual machine 221A and a virtual machine execution module 222A. Then, the server 22A controls the virtual machine 221A and the virtual machine execution module 222A in an integrated manner in cooperation with various programs such as a system program, a virtual machine program, and a business program which are not shown in the drawings and are stored in the CPU 11 (see FIG. 2) in the server 22A and in an external storage device 13 (see FIG. 2). Incidentally, the system programs and the virtual machine programs are implemented by, for example, Hyper Visor products which are made by Microsoft Corporation and are already known techniques. Moreover, in this embodiment, programs such as an OS (Operating System) will not be particularly explained, but they are used as the need arises.

The virtual machine 221A is an execution module that performs various business operations by reading and executing the business programs from the external storage device 13 in the server 22A. Incidentally, the virtual machine 221A is not limited to one virtual machine and comprises a plurality of virtual machines.

Moreover, the virtual machine 221A comprises one or more virtual NICs. The virtual NIC(s) is a logical NIC and is connected to a software switch in the virtual machine execution module 222A. Then, the software switch is connected to an NIC (communication device 14) in the server 22A. Incidentally, the virtual machine 221A may send or receive packets from the virtual NIC directly via the communication device 14 without connecting the virtual NIC to the software switch.

Moreover, the plurality of virtual machines 221A may use one communication device 14. Furthermore, the virtual machine 221A may include a plurality of virtual NICs and the plurality of virtual NICs may be connected to one or more software switches or one or more communication devices 14.

Figure 15:
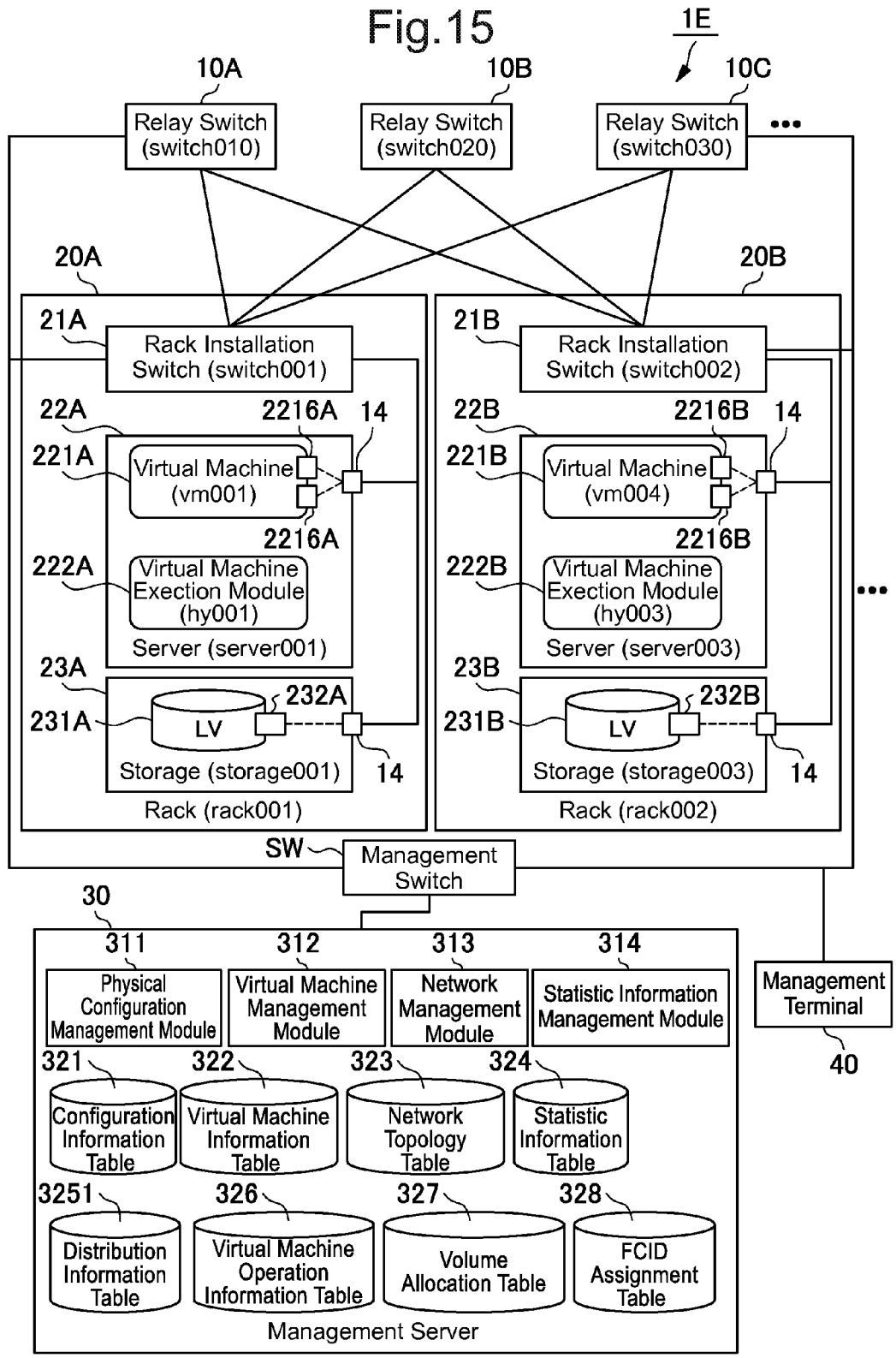
FIG. 15 is a schematic logical configuration diagram of a network management system.

Furthermore, the virtual machine 221A may comprise a VM virtual HBA (Host Bus Adapter) equipped with an initiator function (see FIG. 15). The VM virtual HBA is a logical HBA and a virtual HBA operating in the virtual machine 221A.

The virtual machine execution module 222A is an execution module to efficiently use physical resources such as the CPU 11, the memory 12, and the external storage device 13 in the server 22A by activating the virtual machine programs from the external storage device 13 in the server 22A and thereby executing the plurality of virtual machines 221A.

Furthermore, the virtual machine execution module 222A is configured by being equipped with one or more software switch functions. The software switch function provides the virtual machine 221A with a switch function on the server 22A and is implemented by an already known technique.

The storage apparatus 23A comprises an LV (Logical Volume) which is one or more logical volumes. The LV is formed by grouping external storage devices such as a plurality of HDDs (Hard Disk Drives) into logically one volume. Incidentally, the LV may comprise an LV virtual HBA equipped with a target function (see FIG. 15). The LM virtual HBA is a logical HBA and a virtual HBA operating on the LV in the storage apparatus 23A.

The rack 20B comprises a rack installation switch 21B, a server 22B, and a storage apparatus 23B; and the server 22B comprises a virtual machine 221B and a virtual machine execution module 222B. Since the configurations of each part in the rack 20B and each part in the server 22B are the same as those of the rack 20A and the server 22A described above, an explanation about them have been omitted here.

When the rack installation switches 21A and 21B are not particularly distinguished one from the other in the following explanation, they will be described as the "rack installation switch 21"; when the server 22A and the server 22B are not particularly distinguished one from the other, they will be described as the "server 22"; when the virtual machines 221A and 221B are not particularly distinguished one from the other, they will be described as the "virtual machine 221"; when the virtual machine execution modules 222A and 222B are not particularly distinguished one from the other, they will be described as the "virtual machine execution module 222"; and when the storage apparatuses 23A and 23B are not particularly distinguished one from the other, they will be described as the "storage apparatus 23."

The management server 30 is connected to the management terminal 40 via the management network N and executes management operations according to this embodiment pursuant to an instruction from the management terminal 40. Incidentally, the management server 30 may be implemented by one physical server or may comprise a plurality of servers. Moreover, the management server 30 and the management terminal 40 may be installed outside the network management system 1A by securing safety by a secret communication environment such as a VPN (Virtual Private Network).

Furthermore, the management server 30 as a software function module comprises a physical configuration management module 311, a virtual machine management module 312, a network management module 313, and a statistic information management module 314; and further comprises a configuration information table 321, a virtual machine information table 322, a network topology table 323, a statistic information table 324, and a distribution information table 325 as tables for storing and managing various pieces of information.

The physical configuration management module 311 manages the configuration information table 321. Moreover, the virtual machine management module 312 manages the virtual machines in cooperation with the virtual machine execution module 222A in order to, for example, deploy, activate, stop, or delete the virtual machine 221, assign the virtual NICs, and assign MAC addresses to the virtual NICs; and also manages the virtual machine information table 322.

Furthermore, the network management module 313 manages the network topology table 323 and also, for example, calculates paths through which communication (flow) is routed.

Incidentally, the "flow" herein used means, for example, a sequence of data communication between NICs with a pair of MAC addresses in an IEEE802.3 network (Ethernet network); and the same can be said about a pair of IP addresses or FCID addresses. Incidentally, multicast communication which is one-to-many communication is not included.

Furthermore, the statistic information management module 314 collects necessary information as statistic information from, for example, switches, routers, or software switches (hereinafter referred to as the "network devices"). The information to be collected is, for example, values measured by transmission counters and reception counters of ports. Then, the statistic information management module 314 stores statistic values of this collected information, such as an average transmission amount and an average reception amount described later (see FIG. 6 and FIG. 7), in a network topology table 323 and a statistic information table 324.

Incidentally, the various tables included in the management server 30, such as the configuration information table 321, the virtual machine information table 322, the network topology table 323, the statistic information table 324, and the distribution information table 325 will be described later and these various tables are implemented by, for example, a relational database.

The management terminal 40 is a computer device used by a system administrator to give management operation instructions to the management server 30 and is configured as, for example, a personal computer, a workstation, or a mainframe.

Figure 2:
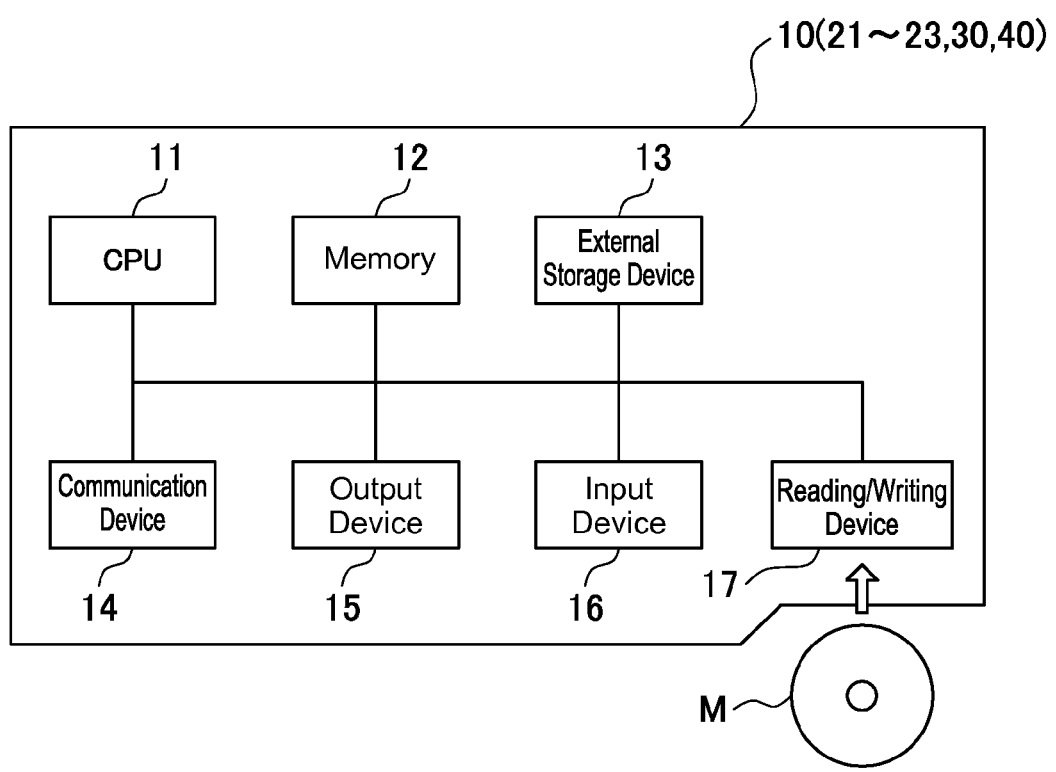
FIG. 2 is a logical configuration diagram of a relay switch.

FIG. 2 illustrates a logical configuration of the relay switch 10. This relay switch 10 comprises a CPU (Central Processing Unit) 11, a memory 12, an external storage device 13, a communication device 14, an output device 15, an input device 16, and a reading/writing device 17. Incidentally, the relay switch 10 may comprise one of each element 11 to 17 or a plurality of each element 11 to 17. Moreover, the relay switch 10 of this example comprises each of the above-mentioned elements, but a general relay switch may be used in this embodiment. The general relay switch does not include the external storage device 13, the output device 15, the input device 16 and the reading/writing device 17 among each of the elements mentioned above, but includes a management interface and an ASIC.

The CPU 11 comprises, for example, a RAM (Random Access Memory) and a ROM (Read Only Media), expands various programs stored in the ROM, the memory 12, or the external storage device 13 in to the RAM, and controls the operations of each element 12 to 17 of the relay switch 10A in an integrated manner in cooperation with the various expanded programs.

The memory 12 comprises, for example, involatile memories such as flash memories and stores various programs and various data.

The external storage device 13 comprises, for example, HDDs and stores various programs and various data.

The communication device 14 comprises, for example, an NIC (Network Interface Card), an I/O port, and a management port, is connected to the rack 20 via the I/O port, and is connected to the management network N via the management port. Moreover, the communication device 14 comprises one or more physical ports, that is, the I/O port and the management port, on one communication device 14.

The output device 15 comprises a monitor display and a speaker, displays static images or moving images on the monitor display, and outputs sounds from the speaker.

The input device 16 comprises a keyboard, a switch, a pointing device, and/or a microphone and receives input operations by the keyboard, switch, pointing device, and/or microphone.

The reading/writing device 17 reads/writes data from/to a portable storage medium M such as a CD (Compact Disk) or a DVD (Digital Versatile Disk). For example, the reading/writing device 17 reads various programs, which are stored in the storage medium M, to the memory 12 or the external storage device 13. Incidentally, the reading/writing device 17 may acquire the various programs by downloading them from a network, which is not shown in the drawing, via the communication device 14.

Moreover, the reference numerals 21 to 23, 30, and 40 in FIG. 2 indicate the functional block diagram of the rack installation switch 21, the server 22, the storage apparatus 23, the management server 30, and the management terminal 40 as a whole. Then, the rack installation switch 21 is configured in the same manner as the relay switch 10; and the server 22 and the storage apparatus 23 are configured in the same manner as the relay switch 10, except that they include only the I/O port in the communication device 14, they are connected to the rack installation switch 21, and the storage apparatus 23 further includes a control device called a controller. Furthermore, the management server 30 and the management terminal 40 are configured in the same manner as the relay switch 10, except that they include only the management port in the communication device 14.

Figure 3:
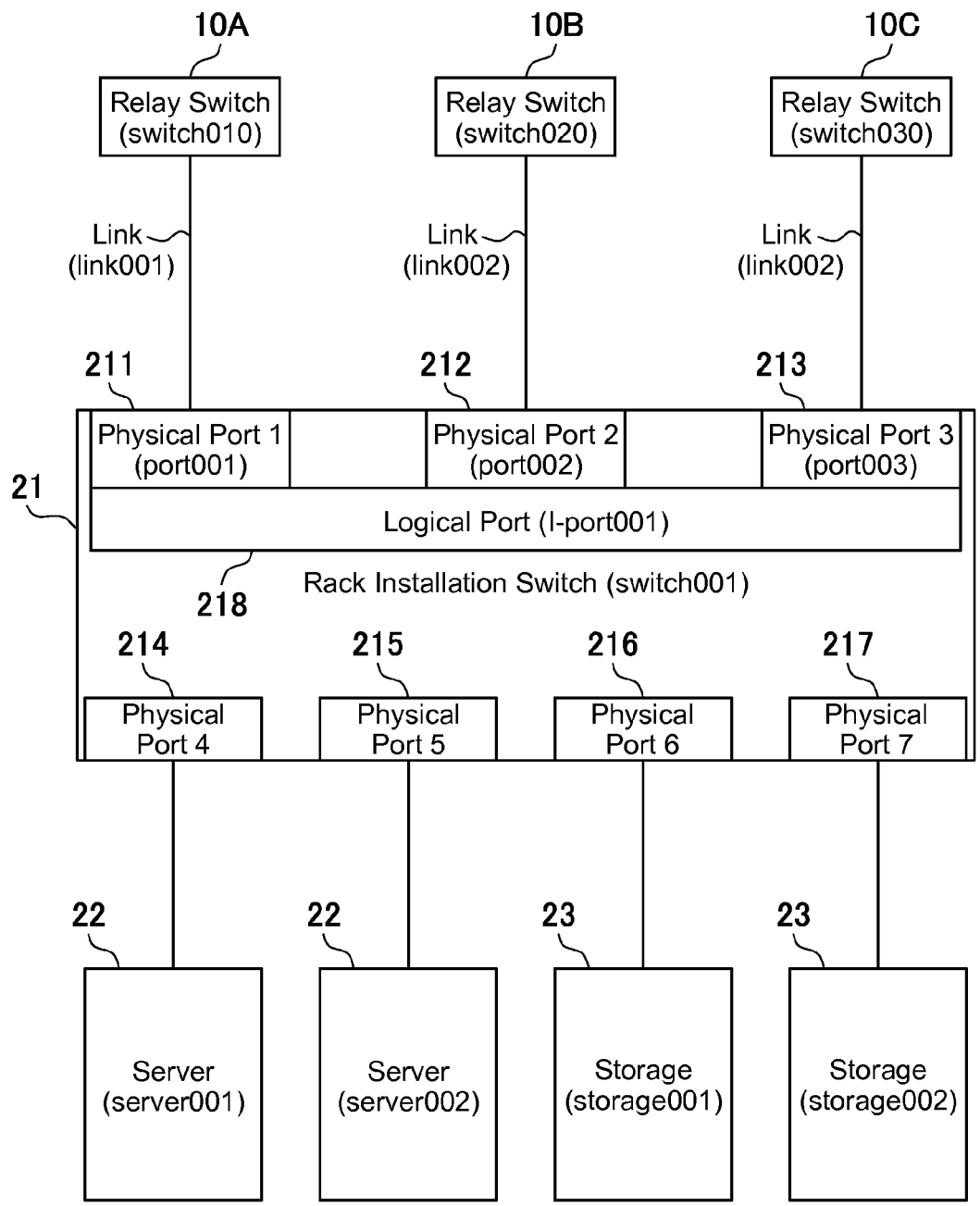
FIG. 3 is a logical configuration diagram of a rack installation switch.

FIG. 3 illustrates a logical configuration of the rack installation switch 21. This rack installation switch 21 is connected to the relay switches 10A to 10C and is also connected to the server 22 and the storage apparatus 23, thereby establishing a link. Then, the rack installation switch 21 comprises a plurality of physical ports 211 to 217 and one logical port 218.

The physical ports 211 to 213 are ports physically connected to the relay switches 10A to 10C. Moreover, each of the physical ports 214 and 215 is a port physically connected to the server 22 and each of the physical ports 216 and 217 is a port physically connected to the storage apparatus 23.

The logical port 218 is a port that logically gathers the physical ports 211 to 213, which are a plurality of member ports, as one port and is implemented by, for example, an LAG which is an already known technique.

Furthermore, a method of distributing packets from the logical port 218 to the physical ports 211 to 213 which are the member ports is implemented by, for example, a distribution method which is an already known technique.

Specifically speaking, a hash value is firstly calculated by using a specific hash function based on an address pair of a source MAC address and a destination MAC address, which is included in a header of the received packet. Then, a link for sending the packet is decided based on the calculation result and the packet is sorted to a physical port connected to the decided link.

More specifically, distribution numbers from "0" to "3" are assigned to the physical ports 211 to 213 in advance. For example, the distribution numbers "0" and "3" are assigned to the physical port 211, the distribution number "1" is assigned to the physical port 212, and the distribution number "2" is assigned to the physical port 213 in advance. Then, a hash function F is calculated by using the following formula (1) in order to calculate exclusive OR of low-order two bits of the source MAC address (for example, $S_2S_1$) and low-order two bits of the destination MAC address (for example, $D_2D_1$).

(Math. 1)

$$F(S,D)=S_2S_1 \oplus D_2D_1 \qquad (1)$$

Then, value K which is the calculation result of the above formula (1) is compared with the aforementioned distribution numbers assigned to the physical ports 211 to 213; and the physical port to which the distribution number having the same value as the calculation result K is selected and the packet is output to this selected physical port. Incidentally, such a distribution method may vary by each network device or by each logical port 218; and, for example, the distribution method may vary between the rack installation switch 21A and the rack installation switch 21B.

(1-2) Structures of Various Tables

FIG. 4 shows the configuration information table 321 among the various tables stored in the management server 30. This configuration information table 321 is a table for managing information about the configuration of the devices provided in the relevant rack and about such devices with respect to each of the racks 20A and 20B.

The configuration information table 321 shown in FIG. 4 includes a device ID column 321A, a device type 321 column B, a rack ID column 321C, a MAC address column 321D, and a connected switch ID column 321E.

Then, the device ID column 321A stores an identifier (device ID) for identifying a device provided in the relevant rack; and the device type column 321B stores identification information for identifying the type of the device provided in the rack. Moreover, the rack ID column 321C stores an identifier (rack ID) for identifying a rack in which the device is placed; the MAC address column 321D stores a MAC address of a physical NIC of the communication device 14 (see FIG. 2) in the device; and the connected switch ID column 321E stores identification information for identifying a network device, such as the relay switch 10A to 10C or the rack installation switch 21A or 21B, which has a connection relationship with that physical NIC.

Therefore, in the case of FIG. 4, for example, it is shown that the type of a device called "server001" is a "server" (server); it is installed in a rack with rack ID "rack001"; its MAC address is "01:23:45:00:00:07"; and it is connected to the network device called "switch001." Similarly, it is shown that the type of a device called "storage001" is "storage" (storage apparatus); it is installed in the rack with the rack ID "rack001"; its MAC address is "01:23:45:00:00:08"; and it is connected to a network device called "switch002." It is also shown that the type of a device called "switch001" is a "switch" (switch); and it is installed in the rack with the rack ID "rack001."

Incidentally, the above-described various pieces of information stored in the configuration information table 321 are configured by the system administrator and/or the physical configuration management module 311 as necessary when each of the above-mentioned devices is installed in the rack 20A or 20B.

FIG. 5 shows the virtual machine information table 322 among the various tables stored in the management server 30. This virtual machine information table 322 is a table for managing information about virtual machines 221 in the server 22.

The virtual machine information table 322 shown in FIG. 5 includes a virtual machine ID column 322A, a server ID column 322B, a virtual machine execution module ID column 322C, a virtual machine management address column 322D, a virtual NIC column 322E, an assigned MAC address column 322F, and a connected switch ID column 322G.

Then, the virtual machine ID column 322A stores an identifier (virtual machine ID) for identifying the virtual machine 221 in the server 22; and the server ID column 322B stores an identifier (server ID) for identifying the server 22 which includes the virtual machine 221.

Moreover, the virtual machine execution module ID column 322C stores an identifier (virtual machine execution module ID) for identifying the virtual machine execution module 222 which operates the virtual machine 221.

Furthermore, the virtual machine management address column 322D stores an address for sending/receiving a control signal for managing the virtual machine, for example, an IP address enabling communication with the virtual machine execution module 222. Incidentally, this IP address is an IP address used for access by the management server 30 and, for example, a different IP address is used for communication with the virtual machine 221.

The virtual NIC column 322E stores identification information for identifying a virtual NIC assigned to the virtual machine 221; and the assigned MAC address column 322F stores a MAC address assigned to the virtual NIC. Then, the connected switch ID column 322G stores identification information for identifying a network device, such as the relay switch 10A to 10C or the rack installation switch 21A or 21B, which has a connection relationship with the virtual NIC.

Therefore, in the case of FIG. 5, for example, it is shown that a virtual machine whose virtual machine ID is "vm001" is installed in the server whose server ID is "server001" and a virtual machine execution module whose virtual machine execution module ID is "hy001" is further provided in this server. Then, it is shown that when the control signal for managing this virtual machine is sent and received, an IP address "192.168.0.101" is used and a virtual NIC "eth0" is assigned to this virtual machine. Then, it is shown that a MAC address "01:23:45:00:00:01" is assigned to the virtual NIC of this virtual machine and the identification information of a network device having a connection relationship with this virtual NIC is "switch001."

Incidentally, it is possible to assign a plurality of virtual NICs to the virtual machine 221. In this case, the virtual NIC column 322E and the assigned MAC address column 322F and the connected switch ID column 322G store a plurality of pieces of information for one virtual machine ID column 322A, so that it is possible to configure various pieces of information about the plurality of virtual NICs, the assigned MAC address, and the connected switch ID with respect to one virtual machine 221 by dividing the virtual machine information table 322 and creating a new table that stores relational information about the virtual machine ID 322A, the virtual NIC 322E, the assigned MAC address 322F, and the connected switch ID 322G.

Furthermore, the above-described various pieces of information stored in the virtual machine information table 322 is configured by the system administrator and/or the virtual machine management module 312 as necessary when configuring or changing the virtual machine 221.

FIG. 6 shows the network topology table 323 among the various tables stored in the management server 30. This network topology table 323 is a table for managing information about links between network devices such as the relay switch 10 and the rack installation switch 21.

The network topology table 323 shown in FIG. 6 includes a link ID column 323A, a source switch ID column 323B, a destination switch ID column 323C, a link bandwidth column 323D, a link cost column 323E, an average transmission amount column 323F, and an average reception amount column 323G.

Then, the link ID column 323A stores an identifier (link ID) for identifying a link; and the source switch ID column 323B and the destination switch ID column 323C store identification information for identifying network devices at both ends of the relevant link (for example, the relay switch 10A and the rack installation switch 21A), respectively. Incidentally, in this example for convenience' sake, expressions "source" switches and "destination" switches are used to identify the network devices; however, these expressions do not mean that their communication is one-way communication. Specifically speaking, a source switch may sometimes receive packets from a destination switch and packets are sent and received bidirectionally between the source switch and the destination switch.

Furthermore, the link bandwidth column 323D stores information (Gbps: Gigabit per second) about a circuit band speed of the relevant link; and the link cost column 323E stores information about cost required when using that link. Incidentally, although the link cost is merely indicated here as a link bandwidth (Gbps), it is not necessarily limited to this example. The link cost is used when calculating a path(s) between network devices. For example, if a multipath is configured between the network devices, a path whose total amount of the link cost is the smallest is decided as the shortest path and thereby used.

Furthermore, the average transmission amount column 323F stores an average value (Gbps) of a packet transmission amount sent from the network device, which is identified by the identification information stored in the source switch ID column 323B, to the network device which is identified by the identification information stored in the destination switch ID column 323C. Incidentally, the average transmission amount stored in this average transmission amount column 323F is calculated by, for example, finding a statistic value as a result of the management server 30's collection of information measured by a transmission counter of the source switch from among connection ports between the network device, which is identified by the identification information stored in the source switch ID column 323B, and the network device which is identified by the identification information stored in the destination switch ID column 323C.

Furthermore, the average reception amount column 323G stores an average value (Gbps) of a packet reception amount received by the network device, which is identified by the identification information stored in the source switch ID column 323B, from the network device which is identified by the identification information stored in the destination switch ID column 323C. Incidentally, the average transmission amount stored in this average reception amount column 323G is calculated by, for example, finding a statistic value as a result of the management server 30's collection of information measured by a reception counter of the source switch from among the connection ports between the network device, which is identified by the identification information stored in the source switch ID column 323B, and the network device which is identified by the identification information stored in the destination switch ID column 323C.

Therefore, in the case of FIG. 6, for example, it is shown that a network device whose source switch ID is "switch001" and a network device whose destination switch ID is "switch010" are connected to both ends of a link whose link ID is "link001"; the link bandwidth and link cost of this link is "10"; and both the average transmission amount and the average reception amount of this link are "9.0."

Incidentally, the above-described various pieces of information stored in the network topology table 323 are configured by the system administrator and/or the network management module 313 as necessary when installing a network device or connecting a link. However, the average transmission amount and the average reception amount is configured by, for example, the statistic information management module 314 periodically collecting the information from the network devices and thereby calculating the statistic values.

FIG. 7 shows the statistic information table 324 among the various tables stored in the management server 30. This statistic information table 324 is a table for managing statistic information about communication data flowing through the network excluding the management network N from the network in the network management system 1A in FIG. 1.

The statistic information table 324 shown in FIG. 7 includes a flow ID column 324A, a source MAC address column 324B, a destination MAC address column 324C, an average transmission amount column 324D, an average reception amount column 324E, and a via link column 324F.

Then, the flow ID column 324A stores identification information for identifying a flow between a communication device 14 or virtual NIC, to which a MAC address stored in the source MAC address column 324B is assigned, and a communication device 14 or virtual NIC, to which a MAC address stored in the destination MAC address column 324C is assigned. Incidentally, in this example for convenience' sake, expressions "source" MAC addresses and "destination" MAC addresses are used to identify the communication devices 14 or the virtual NICs; however, these expressions do not mean that their communication is one-way communication. Specifically speaking, a source MAC address may sometimes receive packets from a destination MAC address and packets are sent and received bidirectionally between the source MAC address and the destination MAC address.

Furthermore, the source MAC address column 324B stores a source MAC address stored in a header part of a communication data packet; and the destination MAC address column 324C stores a destination MAC address. Incidentally, for example, a communication data measurement method called "sFlow" (registered trademark) which is an already known technique is used when acquiring the source MAC address and the destination MAC address. The source MAC address and the destination MAC address can be acquired from the header part of the communication data packet measured by the measurement method called sFlow.

The average transmission amount column 324D stores an average traffic volume of packets with addresses whose source MAC address is stored in the source MAC address column 324B and whose destination MAC address is stored in the destination MAC address column 324C, from among packets measured by the aforementioned measurement method called sFlow.

Furthermore, the average reception amount column 324E stores an average traffic volume of packets with addresses whose source MAC address is stored in the destination MAC address column 324C and whose destination MAC address is stored in the source MAC address column 324B, from among packets measured by the aforementioned measurement method called sFlow.

The via link column 324F stores a list of identifiers (link IDs) of links through which one flow is routed. With respect to the link IDs stored in this via link column 324F, statistic information can be acquired for each physical port on the network device by, for example, the aforementioned measurement method called sFlow, so that the physical port through which the flow is routed can be identified and, therefore, the via links can be identified. Furthermore, if it is difficult to acquire the statistic information for each physical port on the network device, it is possible to identify the via links by path decision procedures described later.

Therefore, in the case of FIG. 7, for example, it is shown that: with respect to a flow whose flow ID is "f001," a MAC address of a source network device is "01:23:45:00:00:01"; a MAC address of a destination network device is "01:23:45:00:00:05"; the average transmission amount of this flow is "5.0," its average reception amount is "3.0"; and this flow is routed through two links whose link IDs are "link001" and "link004."

Incidentally, the above-described various pieces of information stored in this statistic information table 324 is configured by, for example, periodically measuring communication data by the measurement method called sFlow, which is the already known technique, at the network devices such as the relay switch 10 and the rack installation switch 21 and having the management server 30 collect the measurement results and calculate them as the statistic information.

Figure 8:
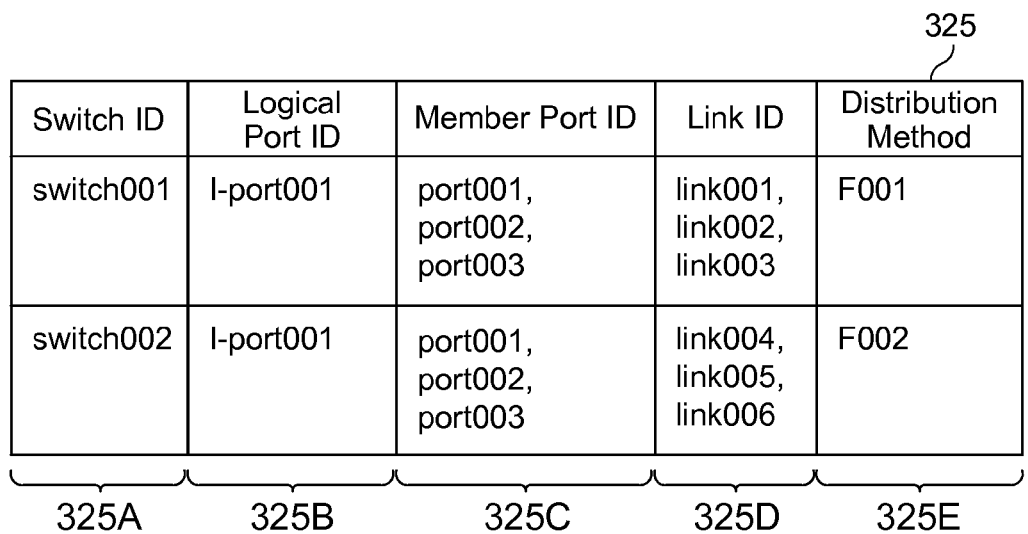
FIG. 8 is a conceptual diagram of a distribution information table.

FIG. 8 shows the distribution information table 325 among the various tables stored in the management server 30. This distribution information table 325 is a table for managing a list of one or more member physical ports 211 to 213 (see FIG. 3) at the logical port 218 (see FIG. 3) on the network devices such as the relay switch 10 and the rack installation switch 21, and a method for distributing packets to these member physical ports 211 to 213. Incidentally, the distribution method will be explained later.

The distribution information table 325 shown in FIG. 8 includes a switch ID column 325A, a logical port ID column 325B, a member port ID column 325C, a link ID column 325D, and a distribution method column 325E.

Then, the switch ID column 325A stores identification information for identifying the relevant network device; and the logical port ID column 325B stores identification information for identifying a logical port 218 configured in the network device.

Furthermore, the member port ID column 325C stores a list of identifiers (member port IDs) for identifying one or more physical ports 211 to 217 (see FIG. 3) which are members of the logical port 218 identified by the identification information stored in the logical port ID column 325B.

Furthermore, the link ID column 325D stores a list of identifiers (link IDs) for identifying one or more links between network devices opposite one or more physical ports identified by the identification information stored in the member port ID column 325C. Incidentally, these link IDs are stored corresponding to the member port IDs stored in the member port ID column 325 mentioned above.

Furthermore, the distribution method column 325E stores identification information for identifying a packet distribution method for one or more physical ports identified by the identification information stored in the member port ID column 325C. The identification information about the distribution method stored in this distribution method column 325E may vary for each network device or each logical port 218 or may be the same. Incidentally, the specific distribution method will be described later.

Therefore, in the case of FIG. 8, for example, it is shown that: a logical port 218 which is "l-port001" is configured in a network device whose switch ID is "switch001"; physical ports whose member port IDs are "port001," "port002," and "port003" are configured in members of this logical port 218; these physical ports correspond to and are connected to links whose link IDs are "link001," "link002," and "link003"; and when distributing and sending packets to these links, the packets are sorted by a distribution method identified by identification information "F001."

Furthermore, the above-described various pieces of information stored in the distribution information table 325 is configured by the system administrator as necessary when, for example, installing a network device.

(1-3) Path Decision Procedures

Path decision procedures for deciding a via link for a flow by using the various tables which have been explained above.

Firstly, the source MAC address column 324B of the statistic information table 324 is compared with the assigned MAC address column 322F of the virtual machine information table 322 to search for information about a matching virtual machine. For example, a virtual machine whose source MAC address stored in the source MAC address column 324B of the statistic information table 324 is "01:23:45:00:00:01" corresponds to a virtual machine whose assigned MAC address stored in the assigned MAC address column 322F of the virtual machine table 322 is "01:23:45:00:00:01."

Next, a connection switch is decided from the connected switch ID column 322G of the virtual machine information table 322 based on the information about the matching virtual machine found by the search. For example, in the above-described example, the virtual machine whose assigned MAC address in the virtual machine information table 322 is "01:23:45:00:00:01" is a virtual machine whose virtual machine ID is "vm001" and the connected switch ID corresponding to this virtual machine ID is "switch001."

Then, a connection switch is also decided with respect to the destination MAC address of the statistic information table 324 in the same manner. Specifically speaking, the destination MAC address column 324C of the statistic information table 324 is compared with the assigned MAC address column 322F of the virtual machine information table 322 to search for a matching virtual machine. Then, reference is made to the connected switch ID column 322 of the virtual machine information table 322 and the connection switch of the matching virtual machine is decided. For example, if the destination MAC address "01:23:45:00:00:05" which is stored in the destination MAC address column 324C of the statistic information table 324 is compared with the assigned MAC address column 322F of the virtual machine information table 322, the virtual machine ID of the matching MAC address is "vm005." Then, the connected switch ID corresponding to this virtual machine ID is "switch002."

As a result, it is found that a flow of this MAC address pair exists between the connection switch "switch001" (the rack installation switch 21A) and the connection switch "switch002" (the rack installation switch 21B).

Incidentally, regarding the above-described processing for recognizing the flow, the MAC address to be searched is the source MAC address (or the destination MAC address) of a virtual NIC on the virtual machine 221; however, the MAC address to be searched is not limited to this example and the MAC address to be searched may be the source MAC address (or the destination MAC address) of a physical NIC in the communication device 14 of the server 22 or the storage apparatus 23. In this case, the MAC address column 321D of the configuration information table 321 is searched for a specific MAC address (the source MAC address or the destination MAC address) and the corresponding connected switch ID is decided from the connected switch ID column 321E at the same time. For example, the server ID of a device whose MAC address is "01:23:45:00:00:07" is "server001" and a connected switch ID corresponding to this device is "switch001." On the other hand, the server ID of a device whose MAC address is "01:23:45:00:00:08" is "server002" and a connected switch ID corresponding to this device is "switch002." As a result, it is found that a flow of this MAC address pair exists between the connection switch "switch001" (the rack installation switch 21A) and the connection switch "switch002" (the rack installation switch 21B).

Now, an ECMP routed through three different relay switches 10A to 10C is configured between the rack installation switch 21A whose switch ID is "switch001" and the rack installation switch 21B whose switch ID is "switch002" (see FIG. 1). Then, the distribution information table 325 is searched for the distribution method for the logical port 218 of the rack installation switch 21A.

Then, the distribution method for this MAC address pair is acquired from the distribution method column 325E and this MAC address pair is input to the distribution method (for example, the aforementioned formula (1)), thereby calculating the calculation result K.

Then, the aforementioned distribution numbers (the numbers assigned in advance: 0 and 3 to the physical port 211A; 1 to the physical port 212A; and 2 to the physical port 213A) is compared with the calculation result K, so that a path through which a packet of this MAC address pair passes is determined.

(1-4) Processing Sequence of Existing Address Reassignment Processing

Next, a processing sequence of processing related to the network management method according to this embodiment will be explained. Incidentally, as a precondition to the processing, the same link cost (for example, the link cost is "10" according to this embodiment; see FIG. 6) is required between each of the rack installation switch 21A and the rack installation switch 21B and the relay switches 10A to 10C in FIG. 1. Specifically speaking, a communication environment between the rack installation switch 21A and the rack installation switch 21B is an ECMP environment where three equal-cost paths exist.

Furthermore, all transfer processing by the network device according to this embodiment is executed at Layer 2 and a packet(s) to be transferred is, for example, a frame(s) of Ethernet (registered trademark); however, the invention is not always limited to this example.

Furthermore, in the following explanation, the management terminal 40 or the management server 30 will be described as a subject of each processing; however, needless to say, actually the CPU 11 in the management terminal 40 or the management server 30 executes the processing in cooperation with various programs stored in, for example, the memory 12 and the external storage device 13, that is, the physical configuration management module 311, the virtual machine management module 312, the network management module 313, and the statistic information management module 314.

Figure 9:
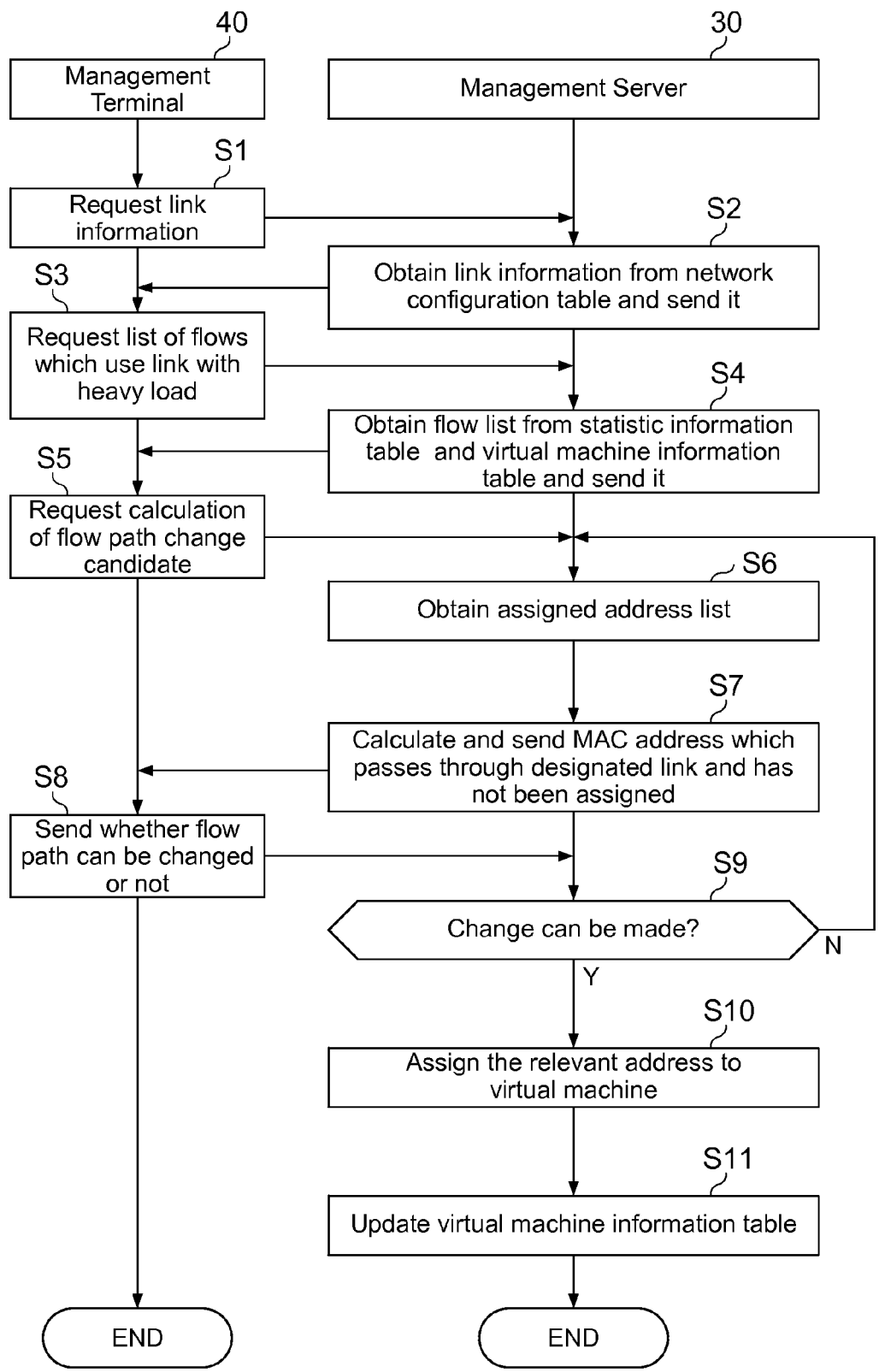
FIG. 9 is a flowchart illustrating a processing sequence of existing address reassignment processing.

FIG. 9 shows a processing sequence of processing for examining a link with biased communication based on the use status of the network in relation to the network management method according to this embodiment and reassigning an existing address to balance a load based on the examination result. The management terminal 40 starts the processing illustrated in FIG. 9 as it accepts a request from the system administrator; or the management server 30 starts the processing illustrated in FIG. 9 as it accepts a request from the management terminal 40.

Specifically speaking, after receiving a request to acquire information about a link between network devices (hereinafter referred to as the "link information") from the system administrator via the input device 16, the management terminal 40 firstly sends the received link information acquisition request to the management server 30 (S1).

Incidentally, a screen of the management terminal 40 used by the system administrator may be a command line user interface (CLI: Command Line user Interface) such as Telnet (Telecommunication network) or may be a graphical user interface (GUI) such as a browser. Furthermore, communication between the management terminal 40 and the management server 30 is implemented by an already known technique such as Telnet or HTTP (Hyper Text Transfer Protocol).

Next, after receiving the link information acquisition request from the management terminal 40, the management server 30 refers to the network topology table 323, acquires the average transmission amount and the average reception amount of all links from the average transmission amount column 323F and the average reception amount column 323G, and sends them to the management terminal 40 (S2).

When the management terminal 40 receives the average transmission amount and the average reception amount of all the links from the management server 30, and if the average transmission amount and/or the average reception amount of a certain link is larger than that of other links based on the received average transmission amount and average reception amount of all the links, the management terminal 40 sends the link ID of the link(s) whose average transmission amount and/or average reception amount is large ("link001" and "link004" in FIG. 6) to the management server 30 and sends a request to the management server 30 to acquire a list of flow IDs of flows which use the link with the link IDs (hereinafter referred to as the "flow list") (S3).

In other words, the management terminal 40 sends the request to the management server 30 to acquire the link IDs of the links with heavy loads and the list of flows which use such links.

After receiving the request to acquire the link IDs and the flow list from the management terminal 40, the management server 30 refers to the statistic information table 324, extracts all via link IDs including the link IDs, which were sent from the management terminal 40 in step S3 as mentioned above, from the via link column 324F, and sends a list of flow IDs corresponding to the extracted via links, that is, a flow list ("f001" and "f003" in FIG. 7) to the management terminal 40 (S4).

After receiving the flow list from the management server 30, the management terminal 40 decides the flow ID of a flow, whose paths should be changed, by the system administrator's selection operation based on the received flow list and sends a flow path change candidate calculation request, including the decided flow ID to be changed and one or more link IDs through which the flow should be routed, to the management server 30 (S5).

After receiving the flow path change candidate calculation request from the management terminal 40, the management server 30 refers to the virtual machine information table 322 and acquires a list of assigned MAC addresses stored in the assigned MAC address column 322F (hereinafter referred to as the "assigned address list") (S6).

Next, the management server 30 calculates a MAC address, which passes through the link(s) of one or more link IDs, which is included in the path change candidate calculation request, and through which the flow should be routed, and which has not been assigned, based on the acquired assigned address list and sends the result to the management terminal 40 (S7).

Now, specific processing in steps S6 and S7 will be explained. After receiving the flow path change candidate calculation request, the management server 30 firstly refers to the statistic information table 324 and acquires the source MAC address and the destination MAC address corresponding to the flow IDs included in the received path change candidate calculation request. Then, the management server 30 selects one of the acquired source MAC address and destination MAC address as an address to be not changed (hereinafter referred to as the "maintained address") and selects the other address as an address to be changed (hereinafter referred to as the "change target address").

Regarding a selection method for selecting which of the source MAC address and the destination MAC address as the maintained address and selecting which of them as the change target address, the following selection method is adopted because it is often difficult to change the MAC address of a physical NIC in the server 22, the storage apparatus 23, or the network device.

Specifically speaking, by focusing attention on the fact that a MAC address assigned to a virtual NIC of a virtual machine 221 can be easily changed by software, the management server 30 refers to the virtual machine information table 322 and judges which of the source MAC address and the destination MAC address is the MAC address assigned to the virtual machine 221.

Then, if it is determined that either one of the source MAC address and the destination MAC address is the MAC address of the virtual NIC assigned to the virtual machine 221, the management server 30 selects either one of the source MAC address or the destination MAC address, which is the MAC address of that virtual NIC, as the change target address and selects the other address as the maintained address.

Furthermore, if it is determined that both the source MAC address and the destination MAC address are MAC addresses assigned to virtual machines 221, the management server 30 selects either the source MAC address or the destination MAC address, which is registered in the statistic information table 324 a larger number of times than the other, as the maintained address and selects the other MAC address which is registered in the statistic information table 324 a smaller number of times, that is, which has less communication targets, as the change target address in consideration of influences that might be caused by changing the MAC address.

For example, in the case of the statistic information table 324 in FIG. 7, the source MAC address "01:23:45:00:00:01" for the flow with the flow ID "f001" is not registered for flows with other flow IDs "f002" to "f006." On the other hand, regarding the flows with the same flow ID "f001," the destination MAC address "01:23:45:00:00:05" is also registered for other flow IDs "f003" and "f006." Therefore, in this case, when selecting the maintained address and the change target address upon reception of the flow path change candidate calculation request from the management terminal 40, the management server 30 selects the source MAC address as the change target address and selects the destination MAC address as the maintained address.

Next, processing for selecting a changed MAC address when changing the change target address will be explained. The management server 30 selects one address of the smallest value in ascending order from the range of predetermined assignable addresses, but excluding addresses included in the assigned address list, as a value used to change the change target address. The selected changed MAC address will be hereinafter referred to as the "candidate address to be assigned."

For example, the management server 30 selects an address of the smallest value in ascending order from the range of predetermined assignable addresses from "01:23:45:00:00:00" to "01:23:45:FF:FF:FF" excluding the addresses included in the assigned address list stored in the assigned MAC address column 322F.

Then, the management server 30 identifies a path (ECMP) between the selected candidate address to be assigned and the aforementioned maintained address in accordance with the path decision procedures of section (1-3) described above and identifies a link through with the flow of this address pair is routed.

Finally, when the identified link is compared with the link(s) of one or more link IDs which are included in the path change candidate calculation request sent from the management terminal 40 in step S5 and through which the flow should be routed, and if they correspond to each other, the management server 30 sends the candidate address to be assigned and the change target address to the management terminal 40.

Incidentally, if they don't correspond to each other, the management server 30 selects a candidate address to be assigned, which is of the second smallest value, identifies a link through which a flow of an address pair of this selected candidate address to be assigned and the maintained address is routed, and compares the identified link with the link of the link ID through which the flow should be routed and which has been sent from the management terminal 40.

Furthermore, regarding the method for selecting the candidate address to be assigned, for example, if the hash function F included in the distribution method column 325E of the distribution information table 325 is not a one-way function, but a function capable of inverse mapping (when it is a function capable of calculation of an inverse function), it is possible to calculate the candidate address to be assigned (hereinafter defined as destination MAC address D) by inputting the maintained address (hereinafter defined as source MAC address S) and distribution number K and thereby calculating an inverse function. Specifically speaking, when the hash function F is calculated as in the following formula (2), the inverse function will be calculated as in formula (3) below.

(Math. 2)

$$K = F(S, D) = S_2 S_1 \oplus D_2 D_1 \tag{2}$$

(Math. 3)

$$D_2 D_1 = F'(S, K) = S_2 S_1 \oplus K \tag{3}$$

The candidate address to be assigned can be calculated more easily by selecting bits other than the low-order two bits of the destination MAC address D calculated by the above formulas (2) and (3) so that the selected bits would not correspond to any assigned MAC address.

Furthermore, when sending the candidate address to be assigned and the change target address to the management terminal 40 in step S7, the management server 30 sends the change target address by searching a list of other flows which would be influenced by changing the change target address to the candidate address to be assigned. Specifically speaking, the management server 30 searches the statistic information table 324 for a list of flows including the change target address, further identifies a path for the flow after the change in accordance with the path decision procedures in section (1-3) described earlier, and sends it together with the change target address. Accordingly, the system administrator can judge the influence by the address change.

After receiving the candidate address to be assigned and the change target address, the management terminal 40 sends information indicating whether the change to be decided by the system administrator's operation can be made or not, to the management server 30 (S8).

After receiving the information indicating whether the change can be made or not, the management server 30 judges whether the change target address can be changed to the candidate address to be assigned (S9).

Then, if a negative result is obtained in this judgment, the management server 30 determines that the change target address cannot be changed to the candidate address to be assigned; and proceeds to step S6 and acquires another candidate address to be assigned.

On the other hand, if an affirmative result is obtained in this judgment, the management server 30 sends a request to the virtual machine execution module 222A to change the MAC address assigned to the virtual machine 221 based on the change target address and the candidate address to be assigned and thereby changes the MAC address of the virtual machine 221 (S10).

Specifically speaking, the management server 30 identifies information about the change target address from the assigned MAC address column 322F of the virtual machine information table 322 and sends a request to the virtual machine execution module 222 to change the MAC address based on the virtual machine ID, the virtual machine management address, and the virtual NIC in the above-identified information. Then, the virtual machine execution module 222 changes the MAC address assigned to the virtual NIC of the virtual machine 221.

Incidentally, under this circumstance, the virtual machine 221 can update an ARP cache or a Layer 3 table of another communication terminal by sending, for example, Gratuitous ARP (Address Resolution Protocol) after changing the MAC address. Then, the virtual machine 221 can promptly continue communication without changing, for example, settings of the communication terminal even after changing the address.

Furthermore, there is a possibility that the candidate address to be assigned may be used before changing the MAC address and transfer information about this candidate address to be assigned may still remain in an FDB (Forwarding Data Base) of the network device. In this case, the FDB information can be updated by sending, for example, a broadcast packet such as a Reverse ARP by using the virtual NIC to which this candidate address to be assigned is assigned. However, if the broadcast packet is transferred to only one physical port (for example, the physical port 211) at the logical port 218 configured as illustrated in FIG. 1 and FIG. 3, only an FDB of one relay switch (for example, the relay switch 10A) is updated. Therefore, when updating FDBs of all the relay switches 10A to 10C, it is necessary to execute processing for copying and transferring a specific broadcast packet (for example, ARP or Reverse ARP) at the logical port 218 to all the member ports.

The management server 30 updates the assigned MAC addresses stored in the assigned MAC address column 322F of the virtual machine information table 322 (S11) and then terminates the existing address reassignment processing.

(1-5) Advantageous Effects of this Embodiment

According to this embodiment described above, it is possible to examine links with a biased communication load based on the use status of the network and reassign an existing MAC address in order to balance the load based on the examination result. As a result, it is possible to implement high-speed load distribution transfer processing in the multipath environment and improve the use efficiency of the network.

(2) Second Embodiment (2-1) Configuration of Network Management System

Referring to FIG. 1, reference numeral 1B represents a network management system 1B according to a second embodiment as a whole. This network management system 1B is configured in the same manner as the network management system 1A according to the first embodiment, except that a new MAC address can be assigned, even when adding a new virtual machine, in order to balance the load on the network and that the management server 30 includes the virtual machine operation information table 326.

Incidentally, if the communication property of the virtual machine to be newly added, including its communication target and traffic volume, is not known at all in advance, it is generally difficult to assign a new MAC address to the virtual machine to be newly added in order to balance the load on the network. However, if the communication property of the virtual machine to be newly added can be estimated in advance, it is possible to assign a new optimum MAC address to the virtual machine to be newly added in accordance with the estimated communication property. So, in this embodiment, an explanation will be given about a method for assigning a new optimum MAC address to a virtual machine to be newly added in order to balance the load on the network in an automatic virtual machine scale-out environment where load distribution is realized by automatically adding a virtual machine based on the same virtual machine image according to the load on virtual machines.

(2-2) Structure of Virtual Machine Operation Information Table

FIG. 10 illustrates the virtual machine operation information table 326 among the various tables stored in the management server 30. Incidentally, this virtual machine operation information table 326 is omitted and not shown in FIG. 1. This virtual machine operation information table 326 is a table for managing information about the status of virtual machines 221 in the server 22.

The virtual machine operation information table 326 shown in FIG. 10 includes a virtual machine ID column 326A, an load-on-virtual-machine column 326B, a CPU threshold column 326C, an average memory usage rate column 326D, a memory threshold column 326E, and an automatic virtual machine increase/decrease possibility column 326F.

Then, the virtual machine ID column 326A stores an identifier (virtual machine ID) for identifying the relevant virtual machine 221 in the server 22; and the load-on-virtual-machine column 326B stores an average usage rate of the CPU 11 of the server 22 for the virtual machine 221.

Furthermore, the CPU threshold column 326C stores a threshold value of a predetermined average CPU usage rate; and the average memory usage rate column 326D stores an average usage rate of the memory 12 of the server 22 for the virtual machine 221.

Furthermore, the memory threshold column 326E stores a threshold value of a predetermined average memory usage rate; and the automatic virtual machine increase/decrease possibility column 326F stores predetermined information indicating whether a copy of the virtual machine can be automatically added or not, that is, whether automatic scale-out is possible or not. For example, the automatic scale-out of a web server is possible, while the automatic scale-out of a database server is not possible in order to prevent data inconsistency.

Incidentally, the aforementioned various other tables 321 to 325 are the same for the second embodiment, so that an explanation about them has been omitted.

(2-3) Processing Sequence of New Address Assignment Processing

Next, a processing sequence of processing related to the network management method according to this embodiment will be explained.

Incidentally, the preconditions to this processing are the same as those to the processing in FIG. 9 according to the first embodiment. Specifically speaking, the ECMP environment with equal-cost paths is established between the rack installation switch 21 and the relay switch 10 and all transfer processing is executed at Layer 2. Moreover, packets to be transferred are Ethernet frames. Then, in the following explanation, the management server 30 will be described as a subject of the processing; however, needless to say, actually the CPU 11 in the management server 30 executes the processing in cooperation with various programs stored in, for example, the memory 12.

Figure 11:
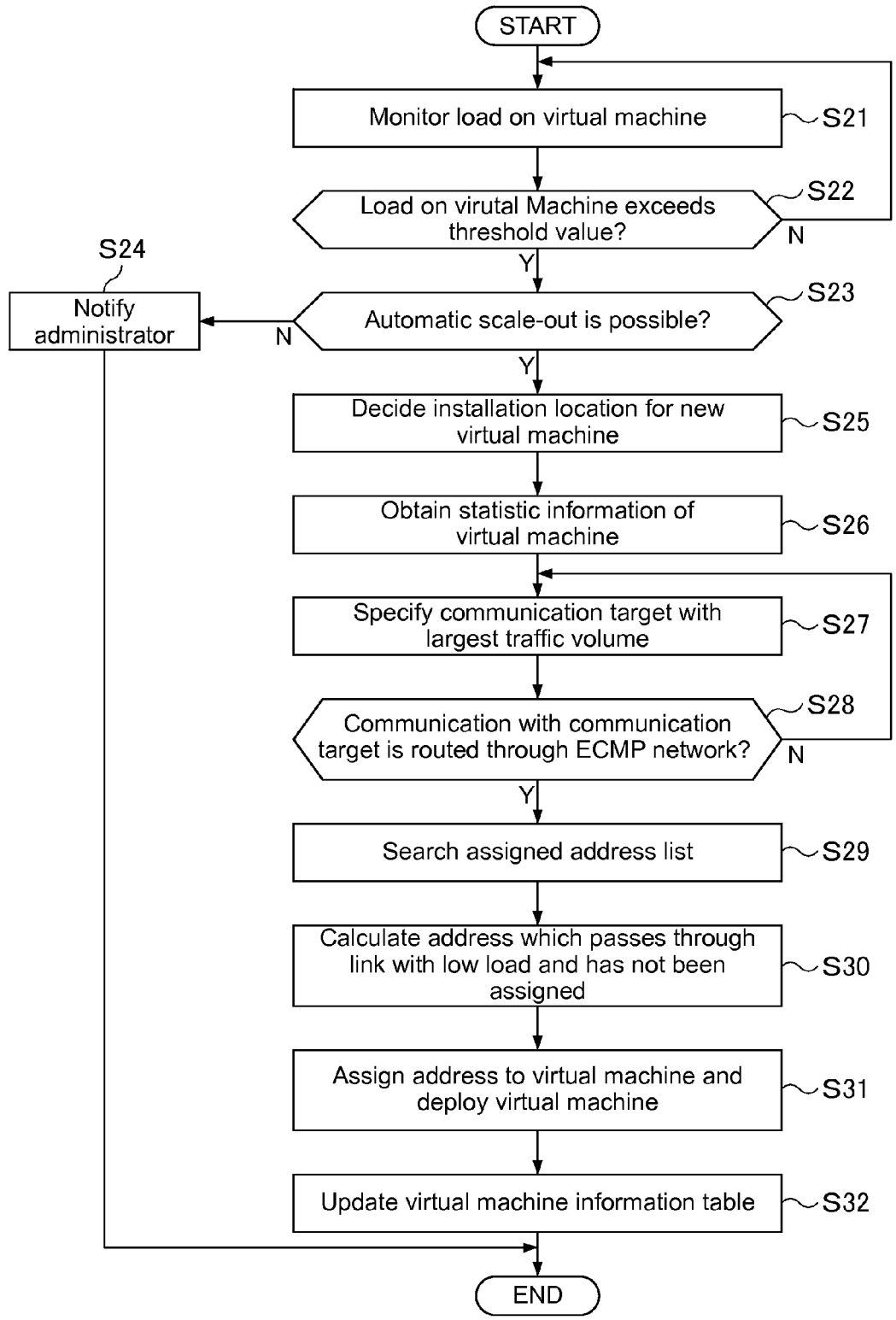
FIG. 11 is a flowchart illustrating a processing sequence of new address assignment processing.

FIG. 11 illustrates a processing sequence of processing for assigning a new MAC address to a virtual machine to be newly added in order to balance the load on the network when automatically adding the new virtual machine in accordance with the load on virtual machines in relation to the network management method according to this embodiment. The management server 30 periodically starts the processing illustrated in FIG. 11.

Specifically speaking, the management server 30 periodically refers to the virtual machine operation information table 326 and monitors the load on the virtual machines 221, that is, an average CPU usage rate (S21).

Then, the management server 30 judges whether the average CPU usage rate of the virtual machines exceeds a predetermined CPU threshold or not (S22).

If a negative result is obtained in this judgment, the management server 30 returns to step S21 and continues monitoring the load on the virtual machines.

On the other hand, if an affirmative result is obtained in the judgment of step S22, the management server 30 refers to the automatic virtual machine increase/decrease possibility column 326F of the virtual machine operation information table 326 and checks if the target virtual machine 221 is a virtual machine of the type capable of automatic scale-out or not (S23).

If a negative result is obtained in this judgment, the management server 30 determines that the automatic scale-out of the target virtual machine 221 is not possible; and notifies the management terminal 40 that the automatic scale-out is not possible (S24).

On the other hand, if an affirmative result is obtained in the judgment of step S23, the management server 30 decides the server 22, whose usage rate of, for example, the CPU 11, the memory 12, and the external storage device 13 is low, as an installation location of the new virtual machine by an already known method. Then, when this happens, the management server 30 generates a new software switch, or selects a software switch which is already being executed, in the virtual machine execution module 222 connected to the virtual NIC of the new virtual machine 221, identifies a physical NIC (communication device 14) to be further connected to this software switch, and identifies a rack installation switch 21 to be further connected to this communication device 14. When the software switch is not to be used, the management server 30 identifies the communication device 14 to be further connected to the virtual NIC and identifies the rack installation switch 21 to be further connected to this communication device 14 (S25).

Next, the management server 30 refers to the virtual machine information table 322 and the statistic information table 324, searches the source MAC address column 324B and the destination MAC address column 324C for the same address as the assigned MAC address of the virtual machine whose usage rate exceeds the aforementioned CPU threshold, and acquires the average transmission amount and the average reception amount of the same source MAC address or destination MAC address (S26).

Then, the management server 30 selects a flow with the largest average value (traffic volume) of the acquired average transmission amount and average reception amount and extracts a MAC address (hereinafter referred to as the "estimated communication address"), which is not the assigned MAC address with the usage rate in excess of the aforementioned CPU threshold, from either the source MAC address or the destination MAC address of this selected flow (S27).

Next, the management server 30 calculates a transfer path to the virtual machine 221, the server 22, or the storage apparatus 23 having the new additional virtual machine 22 and the estimated communication address in accordance with the aforementioned path calculation procedures according to the first embodiment and judges whether the path is routed through the ECMP network or not (S28). Under this circumstance, the path decision procedures in the aforementioned section (1-3) are executed, assuming that the connection switch of the new additional virtual machine 22 is the rack installation switch 21 identified above in step S25.

If a negative result is obtained in this judgment, the management server 30 determines that the calculated transfer path is not an optimization target of the network use efficiency according to this embodiment, returns to step S27, selects a flow with the second largest traffic volume, and continues the processing.

On the other hand, if an affirmative result is obtained in the judgment of step S28, the management server 30 refers to the assigned MAC address column 322F of the virtual machine information table 322 and acquires the assigned address list (S29).

Then, the management server 30 refers to the network topology table 323 and decides one or more links which form a path with the smallest link traffic volume from among ECMP paths between the virtual machine 22 scheduled to be newly added and the virtual machine 22 with the estimated communication address. Incidentally, the traffic volume herein used means, for example, an average value of a sum of the average transmission amount and the average reception amount.

Then, the management server 30 calculates a candidate address to be assigned, which passes through the link decided by the same processing as that in step S7 in FIG. 9 and has not been assigned (S30).

The management server 30 newly adds a virtual machine 22 based on the same image as that of the virtual machine to be scaled out, assigns the candidate address to be assigned to a virtual NIC of this newly added virtual machine 22, and deploys the new virtual machine 22, to which the candidate address to be assigned is assigned, in the server 22 via the virtual machine execution module 222 (S31).

Finally, the management server 30 updates the virtual machine information table 322 (S32) and terminates the new MAC address assignment processing.

(2-4) Advantageous Effects of this Embodiment

When a new virtual machine is to be added to the network as described above according to this embodiment, it is possible to assign an optimum address to the new virtual machine based on the estimated communication property of the virtual machine to be newly added so that the load on the network will be balanced.

(3) Third Embodiment (3-1) Configuration of Network Management System

Referring to FIG. 1, reference numeral 1C represents network management system 1C according to a third embodiment as a whole. This network management system 1C is configured in the same manner as the network management system 1A according to the first embodiment, except that the network use efficiency can be improved by distributing communication flows to as many as the number of ECMPs and transferring them in an environment where no guarantee for the packet transfer order is required (hereinafter referred to as the "communication requirement mixed environment").

Specifically speaking, the aforementioned first embodiment is premised on the environment where packets are sorted to ECMPs on a flow basis in order to guarantee the packet transfer order of communication flows; and realizes a path change on the flow basis by changing the address of the virtual machine 221. However, with a general network management system, various applications operate and there is an environment where applications which require guarantee for the packet transfer order and applications which require no guarantee for the transfer order (for example, an application for transferring a large amount of files) are mixed (communication requirement mixed environment). So, in this third embodiment, an explanation will be given about a method for improving the network use efficiency by distributing communication flows of the applications, which require no guarantee for the transfer order, to as many as the number of ECMPs and transferring them in the communication requirement mixed environment.

(3-2) Logical Configuration of Virtual Machine

Figure 12:
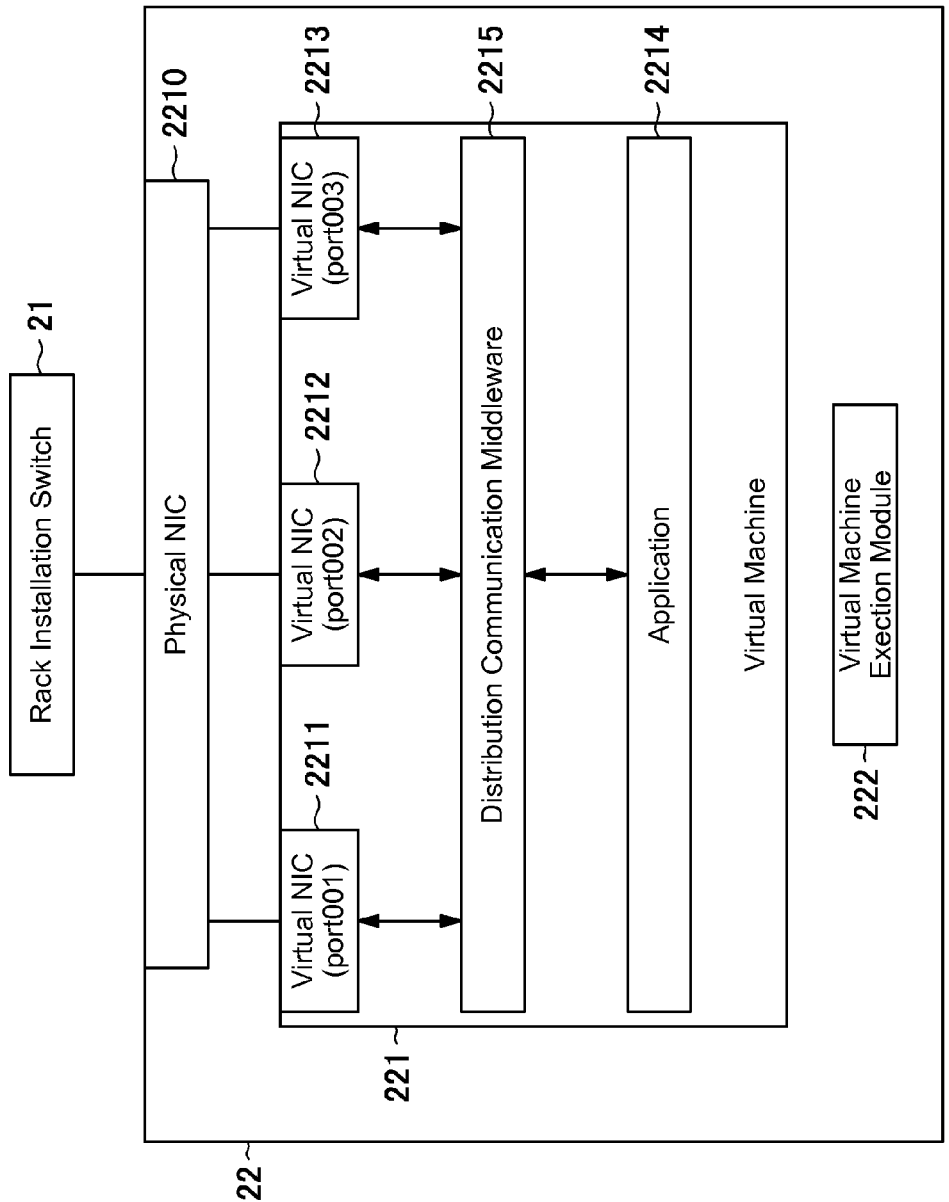
FIG. 12 is a logical configuration diagram of a virtual machine including distribution communication middleware.

FIG. 12 illustrates a logical configuration of a virtual machine 221 according to this embodiment. This virtual machine 221 comprises an application 2214, distribution communication middleware 2215, and a plurality of virtual NICs 2211 to 2213.

The application 2214 is, for example, a business program such as a web server program; and the distribution communication middleware 2215 is software having a distribution transmission function using one or more virtual NICs 2211 to 2213 at the same time and, for example, distributing and sending packets randomly and an integrated reception function delivering the packets received from the plurality of virtual NICs 2211 to 2213 to the application 2214.

After receiving packets from the distribution communication middleware 2215, the virtual NICs 2211 to 2213 send the received packets to the physical NIC 2210; and after receiving packets from the physical NIC 2210, the virtual NICs 2211 to 2213 send the received packets to the distribution communication middleware 2215. Incidentally, when the virtual NICs 2211 to 2213 are not particularly distinguished one from another in the following explanation, they will be simply described as the "virtual NIC."

Incidentally, the aforementioned various other tables 321 to 325 are the same for the third embodiment, so that an explanation about them has been omitted.

(3-3) Processing Sequence of Processing for Distributing and Transferring Packets to Virtual NICs Next, a processing sequence of processing related to the network management method according to this embodiment will be explained.

Incidentally, the preconditions to this processing are the same as those to the processing in FIG. 9 according to the first embodiment. Specifically speaking, the ECMP environment with equal-cost paths is established between the rack installation switch 21 and the relay switch 10 and all transfer processing is executed at Layer 2. Moreover, packets to be transferred are Ethernet frames. Then, in the following explanation, the distribution communication middleware 2215, the management server 30, and the virtual machine execution module 222 will be described as subjects of the processing; however, needless to say, actually the CPU 11 in the server 22 executes the processing in cooperation with programs stored in, for example, the memory 12 and the external storage device 13 (the distribution communication middleware 2215 or the virtual machine execution module 222) or the CPU 11 in the management server 30 executes the processing in cooperation with various programs stored in, for example, the memory 12 and the external storage device 13.

Figure 13:
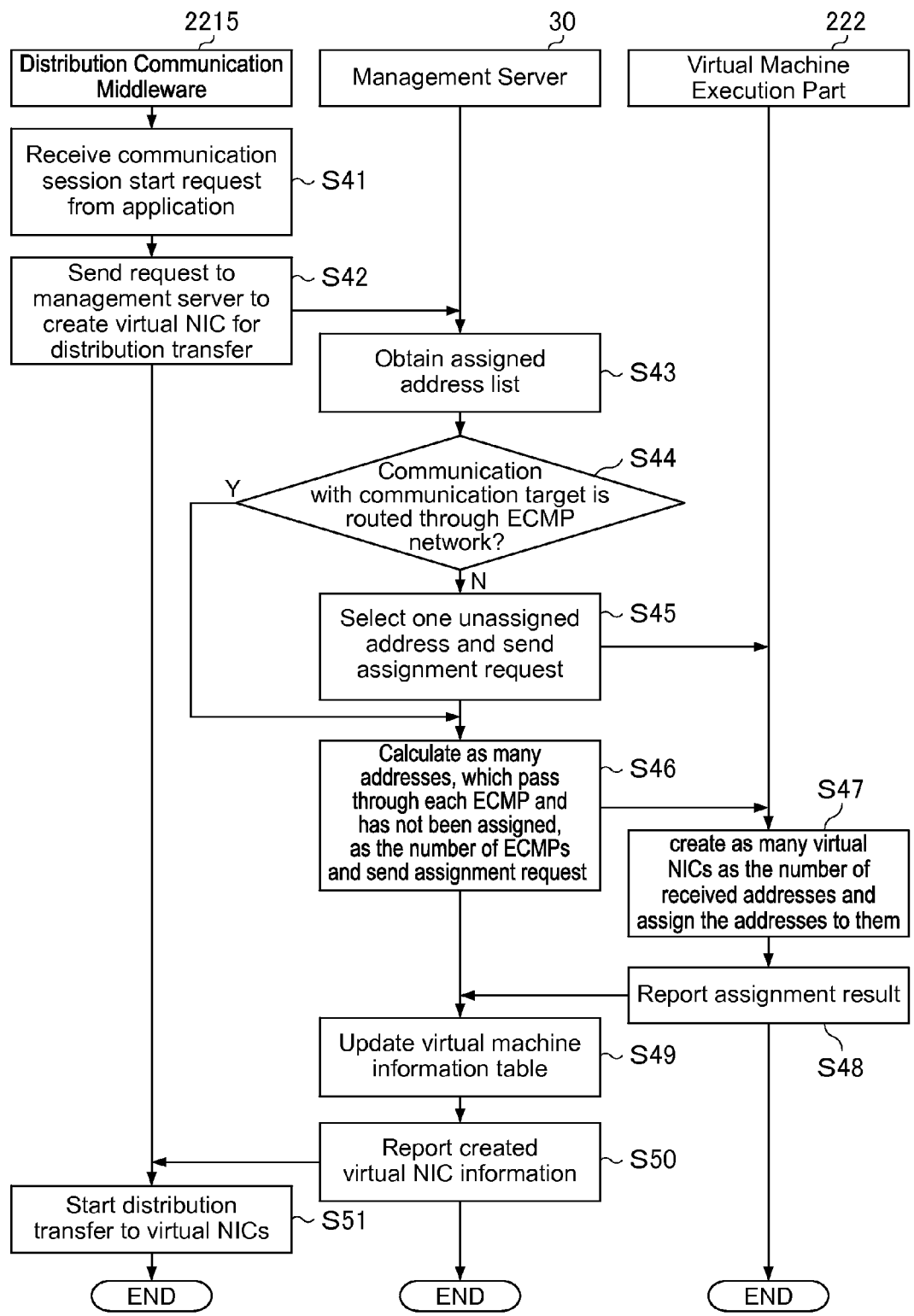
FIG. 13 is a flowchart illustrating a processing sequence of processing for performing distribution transfer to a virtual NIC.

FIG. 13 illustrates a processing sequence of processing to be executed on the virtual machine 221 in operation, for creating a plurality of virtual NICs 2211 to 2213 and assigning addresses to the plurality of created virtual NICs 2211 to 2213 to distribute and transfer packets to all ECMPs, in relation to the network management method according to this embodiment. After the distribution communication middleware 2215 receives a communication start request from the application 2214, the distribution communication middleware 2215, the management server 30, and the virtual machine execution module 222 start the processing illustrated in FIG. 13.

Specifically speaking, after receiving a communication session start request from the application 2214 which requires no guarantee for the packet transfer order (S41), the distribution communication middleware 2215 sends a request to the management server 30 to create the virtual NICs 2211 to 2213 for distribution transfer (S42).

Incidentally, the communication session start request from the application 2214 includes information about a MAC address of a communication partner; and when sending a request to create the virtual NICs 2211 to 2213 for distribution transfer, the distribution communication middleware 2215 also sends information about the MAC address of the communication partner.

After receiving the request from the distribution communication middleware 2215 to create the virtual NICs 2211 to 2213 for distribution transfer, the management server 30 acquires the assigned address list by referring to the assigned MAC address column 322F of the virtual machine information table 322 (S43).

Next, the management server 30 judges whether communication with the communication target is routed through the ECMP network or not, in accordance with the path decision procedures described earlier in the first embodiment (S44).

If a negative result is obtained in this judgment, the management server 30 arbitrarily selects an unassigned MAC address and sends this selected MAC address together with an assignment request to the virtual machine execution module 222 (S45).

On the other hand, if an affirmative result is obtained in the judgment of step S44, the management server 30 calculates MAC addresses, which path through each of the ECMPs and which have not been assigned, as many as the number of the ECMPs and sends the calculated MAC addresses together with the assignment request to the virtual machine execution module 222 (S46).

Incidentally, for example, in the case of the network management system 1C shown in FIG. 1, there are three ECMPs and, therefore, the number of unassigned MAC addresses to be calculated is three. Moreover, the method for calculating this unassigned MAC address is the same as that used in the processing of step S7 in FIG. 9 as described in the first embodiment, so that an explanation about it has been omitted here.

After receiving the MAC address and the assignment request from the management server 30, the virtual machine execution module 222 creates as many virtual NICs 2211 to 2213 as the number of the received MAC addresses and assigns the received MAC addresses to the created virtual NICs 2211 to 2213 (S47).

Then, the virtual machine execution module 222 sends identification information about the created virtual NICs 2211 to 2213 and the assignment results of the MAC addresses assigned to the created virtual NICs 2211 to 2213 to the management server 30 (S48).

After receiving the identification information about the virtual NICs 2211 to 2213 and the assignment results from the virtual machine execution module 222, the management server 30 updates the virtual machine information table 322 by having the received identification information about the virtual NICs 2211 to 2213 and the assignment results reflected in the virtual machine information table 322 (S49). Incidentally, under this circumstance, the management server 30 may divide the virtual machine information table 322 in order to store the information about the plurality of virtual NICs 2211 to 2213.

Then, the management server 30 notifies the distribution communication middleware 2215, which is a requestor, of the identification information about the created virtual NICs 2211 to 2213 (S50).

After receiving the identification information about the virtual NICs 2211 to 2213 from the management server 30, the distribution communication middleware 2215 terminates the distribution transfer processing on these virtual NICs 2211 to 2213 by starting distributing and transferring packets to the virtual NICs 2211 to 2213 identified by the received identification information (S51).

(3-4) Advantageous Effects of this Embodiment

According to this embodiment as described above, it is possible to distribute and transfer communication flows of the application 2214, which requires no guarantee for the transfer order, to as many as the number of the ECMPs and thereby improve the network use efficiency in the communication requirement mixed environment where no guarantee for the packet transfer order is required.

(4) Fourth Embodiment

(4-1) Configuration of Network Management System

Referring to FIG. 1, reference numeral 1D represents network management system 1D according to a fourth embodiment. This network management system 1D is configured in the same manner as the network management system 1D according to the first embodiment, except that if a communication failure occurs at a specific path in the multipath environment, an area of influence upon the occurrence of the communication failure, for example, information indicating which communication between which communication terminals is affected in terms of, for example, packet loss, by that communication failure, can be estimated promptly.

(4-2) Processing Sequence of Processing for Estimating Area of Influence at the Time of Communication Failure Next, a processing sequence of processing related to the network management method according to this embodiment will be explained.

Incidentally, a characteristic precondition to this embodiment is that the management server 30 periodically monitors each network device alive by an already known method such as Ping. Moreover, the network devices are configured to send traps to the management server 30. The traps are implemented by an already known technique such as SNMP (Simple Network Management Protocol) TRAP. Moreover, types of trap target events include link status change events.

Furthermore, the preconditions to this processing are the same as those to the processing in FIG. 9 according to the first embodiment. Specifically speaking, the ECMP environment with equal-cost paths is established between the rack installation switch 21 and the relay switch 10 and all transfer processing is executed at Layer 2. Moreover, packets to be transferred are Ethernet frames. Then, in the following explanation, the management server 30 and the management terminal 40 will be described as subjects of the processing; however, needless to say, actually the CPU 11 in the management server 30 and the management terminal 40 executes the processing in cooperation with programs stored in, for example, the memory 12 and the external storage device 13.

Figure 14:
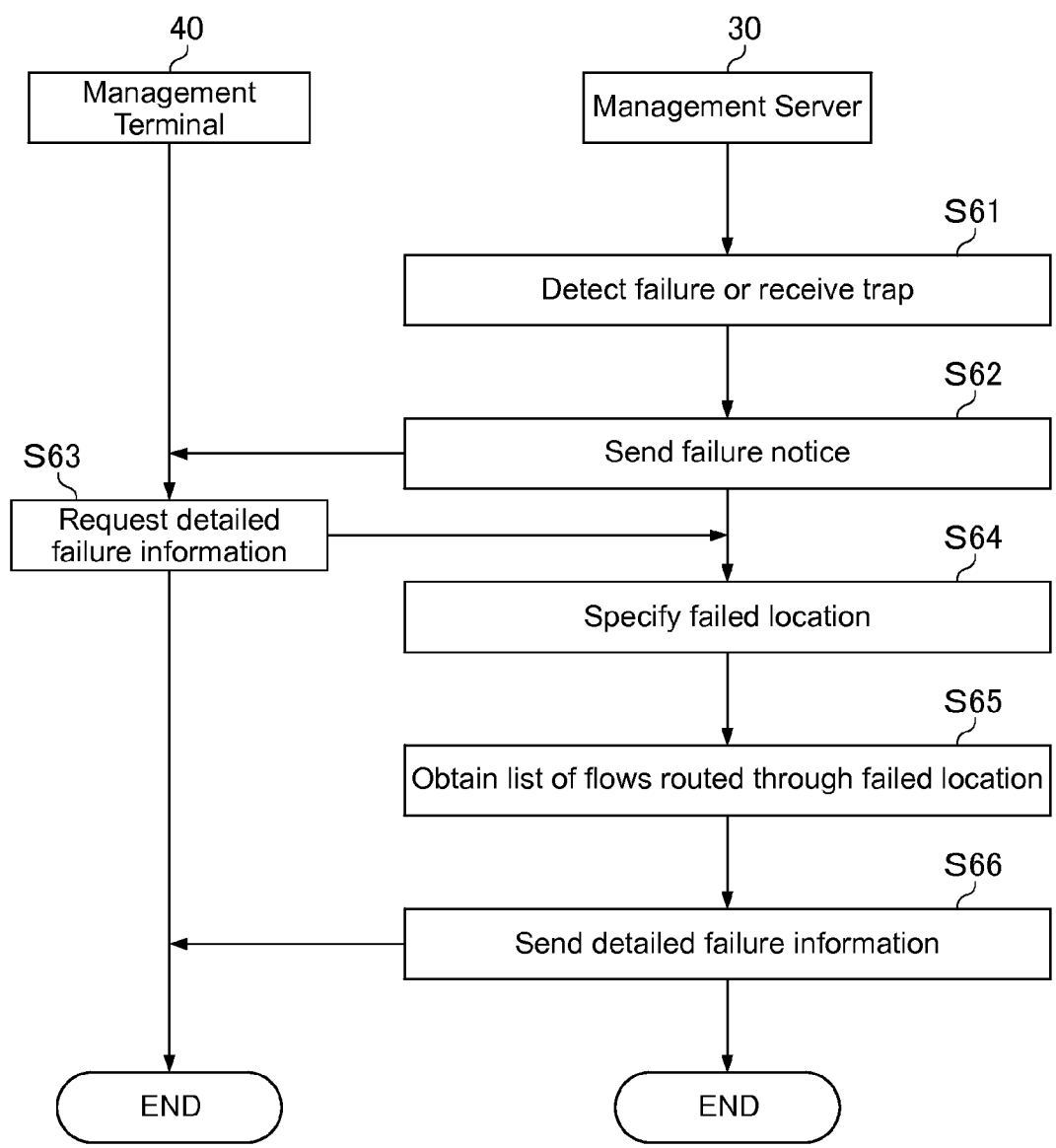
FIG. 14 is a flowchart illustrating a processing sequence for estimating an area of influence upon the occurrence of a communication failure.

FIG. 14 illustrates a processing sequence of processing executed when a communication failure occurs at a certain path in the multipath environment, for promptly estimating the area of influence by that communication failure in relation to the network management method according to this embodiment. After detecting the communication failure or receiving a trap, the management server 30 starts the processing illustrated in FIG. 14.

Firstly, when the management server 30 detects a failure of a network device or a failure of a link (such as link-down) by live monitoring by means of, for example, Ping (S61), it sends a failure notice to the management terminal 40 (S62). A method of sending notice to the management terminal 40 is, for example, e-mail.

After receiving the failure notice from the management server 30, the management terminal 40 requests the management server 30 for detailed failure information (S63).

When the management server 30 receives the detailed failure information from the management terminal 40 in the case of the live monitoring, it determines that it is a device failure. On the other hand, when the management server 30 receives notice of link-down via a trap and if it is possible to determine as a result of the live monitoring that a device at the opposite end of the link through which the trap has been received is operating, the management server 30 determines that it is a failure of the link which has suffered the link-down (including a port failure of a port forming the link), and then identifies the failed location (S64).

Then, the management server 30 acquires a list of flows routed through the failed location identified in step S64 based on the network topology table 323 and the statistic information table 324 (S65).

For example, if the failed location identified in step S64 is a device failure of the rack installation switch 21A, the management server 30 firstly refers to the network topology table 323, searches the source switch ID column 323B or the destination switch ID column 323C for the switch ID "switch001" of the rack installation switch 21A, and acquires link information including this link ID (records of link IDs "link001," "link002," and "link003"). Next, the management server 30 refers to the statistic information table 324, searches the via link column 324F for the link IDs included in one or more pieces of the previously acquired link information, and acquires a list of matching flows (records of flow IDs "f001," "f002," "f003," "f004," and "f005").

Subsequently, the management server 30 refers to the virtual machine information table 322 and the configuration information table 321, searches the assigned MAC address column 322F or the MAC address column 321D for the source MAC address and the destination MAC address which are included in the flow list acquired in step S65 mentioned above, and identifies the virtual machine 221, the server 22, or the storage apparatus 23, to which the matching MAC addresses are assigned, by the virtual machine ID or the device ID. Then, the management server 30 recognizes a list of the identified virtual machine 221, server 22 or storage apparatus 23, the failed location, and detection time as detailed failure information, and sends it to the management terminal 40 (S66), thereby terminating this processing for estimating the area of influence upon the occurrence of the communication failure.

(4-3) Advantageous Effects of this Embodiment

If a failure occurs at a certain path in the multipath environment, it is possible as described above to promptly identify the area of influence according to this embodiment upon the occurrence of the communication failure without searching, for example, the FDB.

(5) Fifth Embodiment (5-1) Configuration of Network Management System

Referring to FIG. 15, reference numeral 1E represents a network management system 1E according to a fifth embodiment as a whole. This network management system 1E is configured in the same manner as the network management system 1A according to the first embodiment, except that communication according to the already known FCoE (Fibre Channel over Ethernet) protocol is performed between a server 22 and/or a virtual machine 221 and a storage apparatus 23 and/or an LV 231 in the multipath environment, the virtual machine 221 comprises a VM virtual HBA (Host Bus Adapter) 2216 having an initiator function, the LV 231 comprises an LV virtual HBA 232 having a target function, and a management switch SW is included as an example of a means for implementing the management network N.

Incidentally, the FCoE is a standard for encapsulating Fiber Channel (FC: Fiber Channel) frames into Ethernet frames and making them operate on the Ethernet. The FCoE standards are being standardized by a standardization organization called ANSI/INCITS (American National Standards Institute/International Committee for Information Technology Standards) T11 and functional models and so on are defined.

When performing communication using the FCoE, a source MAC address and a destination MAC address which are included in an Ethernet frame in which the FC is encapsulated (hereinafter referred to as the "FCoE packet") may be sometimes changed at a network device along a communication path. So, when performing communication using the FCoE in the multipath environment, for example, when distributing packets received at the logical port 218 (see FIG. 3) of the rack installation switch 21A in the aforementioned first embodiment, it is possible to decide a distribution destination by means of calculation by using, for example, the hash function F of the aforementioned formula (1) and using the source FCID and destination FCID which are included in the FCoE packet by the aforementioned distribution method in the explanation of FIG. 3. Incidentally, an FCID is a unique 24-bit address used for frame transfer of the Fibre Channel in the FC network and is included in an FCoE packet.

In this embodiment, the communication device 14 such as an NIC included in the server 22 and the storage apparatus 23 has an HBA function corresponding to the FCoE. The HBA function is not limited to implementation on the communication device 14, but may be implemented, for example, as a program in the server 22. Furthermore, one or more VM virtual HBAs 2216 can be assigned to a virtual machine 221. Furthermore, regarding the storage apparatus 23, one or more LV virtual HBAs 232 can be assigned to each LV 231.

The VM virtual HBA 2216 and/or the LV virtual HBA 232 is a program for logically dividing and using the HBA function. For example, as the virtual machine execution module 222 assigns the VM virtual HBA 2216 to the virtual machine 221, it is possible to provide an environment of connection to the LV 231 for each virtual machine 221.

Furthermore, the rack installation switch 21 has an FDF (FCoE Data Forwarder) function that implements a data transfer function according to FCoE standards (FC-BB-6); and the management switch SW has an FCF (Fiber Channel Forwarder) function that implements a fabric service function according to the FCoE standards (FC-BB-6).

(5-2) Structures of Various Tables

Figure 16:
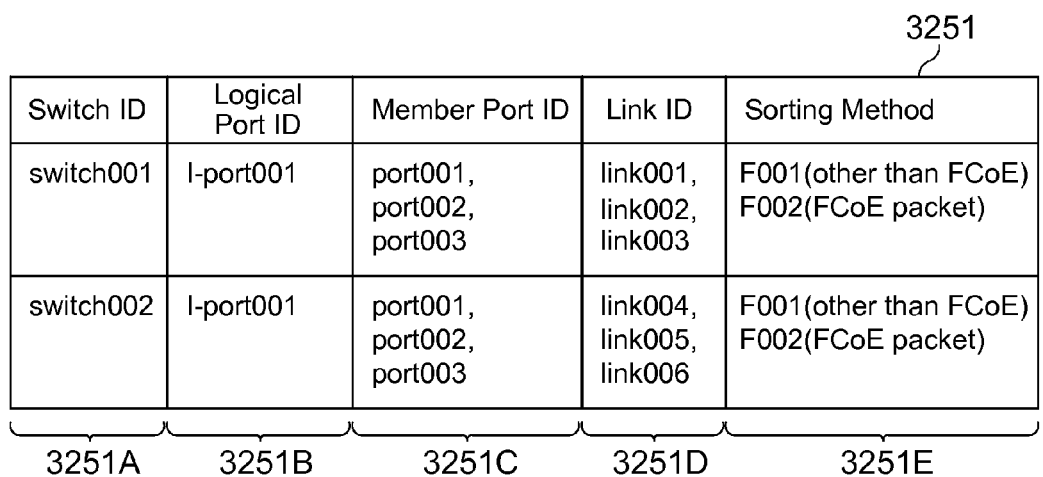
FIG. 16 is a conceptual diagram of a distribution information table.

FIG. 16 illustrates a distribution information table 3251 among the various tables stored in the management server 30. This distribution information table 3251 is configured in the same manner as the distribution information table 325 (see FIG. 8) explained in the first embodiment, except that different distribution methods are configured for a case where a packet other than FCoE is received in the distribution method column 3251E and a case where a FCoE packet is received.

FIG. 17 illustrates a volume allocation table 327 among the various tables stored in the management server 30. This volume allocation table 327 is a table for managing information about assignment of LVs 231 to virtual machines 221.

The volume allocation table 327 shown in FIG. 17 includes a server ID column 327A, a virtual machine ID column 327B, a VM virtual HBA/WWPN (World Wide Port Name) column 327C, a storage ID column 327D, an LVID column 327E, and an LV virtual HBA/WWPN column 327F.

Then, the server ID column 327A stores an identifier (server ID) for identifying the relevant server 22; and the virtual machine ID column 327B stores an identifier (virtual machine ID) for identifying the relevant virtual machine 221.

Furthermore, the VM virtual HBA/WWPN column 327C stores a WWPN which is identification information for identifying the logical port 218 of the VM virtual HBA 2216 assigned to the virtual machine 221.

Furthermore, the storage ID column 327D stores an identifier (storage ID) for identifying the relevant storage apparatus; and the LVID column 327E stores an identifier (LV ID) for identifying the relevant LV.

Furthermore, the LV virtual HBANVWPN column 327F stores a WWPN which is identification information for identifying the logical port 218 of the LV virtual HBA 232 assigned to the LV 231.

Therefore, in the case of FIG. 17, for example, it is shown that a server 22 with the server ID "server001" includes a virtual machine 221 with the virtual machine ID "vm001" and a VM virtual HBA 2216 whose WWPN is "10:00:00:00:00:00:aa:01" is assigned to this virtual machine 221. It is also shown that the storage apparatus 23 with a storage ID "storage001" and an LV 231 with the LV ID "lv001" are assigned to this server and an LV virtual HBA 232 whose WWPN is "10:00:00:00:00:00:ab:01" is further assigned to this LV 231.

Incidentally, the above-described various pieces of information stored in the volume allocation table 327 are configured by the system administrator as necessary when creating a virtual machine 221.

FIG. 18 illustrates an FCID assignment table 328 among the various tables stored in the management server 30. This FCID assignment table 328 is a table for managing FCID information issued to the virtual HBA 2216 or 232 by associating it with the WWPN of this virtual HBA 2216 or 232.

The FCID assignment table 328 shown in FIG. 18 includes an FDF switch ID column 328A, a WWPN column 328B, and an FCID column 328C.

Then, the FDF switch ID column 328A stores an identifier (switch ID) for identifying the relevant network device having an FDF function. Incidentally, the FDF function is a function that receives various requests using FIP (FCoE Initialization Protocol) which is a protocol for initializing FCoE from the virtual HBA 2216.

Furthermore, the WWPN column 328B stores an identifier (WWPN) for identifying the relevant virtual HBA 2216 which is a requestor included in an FLOGI (Fabric Login) request and/or an NPIV-FDISC (N Port ID Virtualization-Fabric Discovery) request using FIP received by an FDF switch.

Furthermore, the FCID column 328C stores an FCID issued to the virtual HBA 2216 or 232 which is the requestor. An FCID is a unique 24-bit address used for FC frame transfer in the FC network.

Therefore, in the case of FIG. 18, it is shown that an FLOGI request or an NPIV-FDISC request is issued from the virtual HBA 2216 whose WWPN is "10:00:00:00:00:00:aa:01" to the network device with the FDF switch ID "switch001" and the FCID "00:00:01" is issued to this HBA or the virtual HBA which is the requestor.

Incidentally, the virtual HBA creates a new FPMA (Fabric Provided Mac Address) by combining FCID and FC-MAP included in a response to the FLOGI request and/or the NPIV-FDISC request. The FC-MAP is 48-bit data defined for each fabric service of the FCF. Specifically speaking, if the fabric service is different, the FC-MAP is also different; so, a unique 48-bit MAC address is generated in the network by combining the FC-MAP and the FCID.

Furthermore, the above-described various pieces of information stored in the FCID assignment table 328 are configured automatically when the management server 30 receives the FLOGI request and/or the NPIV-FDISC request via the FDF and/or the FCF and issues an FCID. Furthermore, a table having the same structure as that of this FCID assignment table 328 is also retained in a network device (for example, the management switch SW) having the FCF function and is updated by the FCF function.

(5-3) Processing Sequence of FCID Issuance Processing

Next, a processing sequence of processing related to the network management method according to this embodiment will be explained. Incidentally, as preconditions to the processing, FCoE initialization has already been performed according to, for example, FIP (FCoE Initialization Protocol) which is part of the already known FCoE standards, and connection between the FCF function and the FDF function is established. Moreover, it is premised that when the HBA is activated, the rack installation switch 21 having the FDF function has already been discovered by the HBA by an already known method such as FIP-Discovery and the destination MAC address of the rack installation switch 21 having the FDF function is known.

Furthermore, in the following explanation, the HBA or the virtual HBA 223, the rack installation switch 21, the rack installation switch SW, and the management server 30 will be described as subjects of the processing; however, needless to say, actually the CPU 11 in each of the server 22, the rack installation switch 21, the management switch SW, and the management server 30 executes the processing in cooperation with various programs stored in, for example, the memory 12 and the external storage device 13.

FIG. 19 illustrates a processing sequence of processing for issuing an FCID in a case of communication according to the FCoE protocol to allow such communication to pass through a certain path in relation with the network management method according to this embodiment. After receiving a login request, an HBA or a virtual HBA starts the processing illustrated in FIG. 19.

Specifically speaking, the LV virtual HBA 232 which has already been assigned to the VM virtual HBA 223 or the LV 231 assigned to the virtual machine 221 (hereinafter collectively simply referred to as the "virtual HBA") sends the login request to the rack installation switch 21 having the PDF function via the communication device 14 having the HBA function (S71).

This login request is realized by, for example, an NPIV-FDISC request according to the FCoE standards. Then, this login request includes at least an identifier (WWPN) for identifying the virtual HBA which is the requestor. Moreover, the WWPN is assigned to the virtual HBA by, for example, the system administrator in advance.

After receiving the login request from the virtual HBA, the rack installation switch 21 sends a login processing request to the management switch SW by sending the WWPN included in the login request and an identifier (FDF switch ID) of the rack installation switch 21 as this login processing request (S72).

After receiving the login processing request from the rack installation switch 21, the management switch SW sends an FCID request to the management server 30 (S73).

Incidentally, the FCID request includes at least the identifier (WWPN) for identifying the virtual HBA, which is the requestor, and the identifier (FDF switch ID) for identifying the rack installation switch 21.

After receiving the FCID request from the management switch SW, the management server 30 refers to the volume allocation table 327 and searches WWPNs stored in the VM virtual HBANVWPN column 327C and/or the LV virtual HBANVWPN column 327F for the WWPN included in the FCID request. Specifically speaking, the management server 30 judges whether the WWPN included in the received FCID request is a WWPN registered in the volume allocation table 327 or not (S74).

If a negative result is obtained in this judgment, the management server 30 proceeds to step S78. On the other hand, if an affirmative result is obtained in this judgment, the management server 30 determines that the WWPN included in the received FCID request is a WWPN registered in the volume allocation table 327. Then, the management server 30 refers to the FCID assignment table 328 and searches WWPNs stored in the WWPN column 328B for another WWPN (hereinafter referred to as the "communication target WWPN") which is of the same record as that of the WWPN registered in the aforementioned volume allocation table 327 and is different from this WWPN.

Specifically speaking, if the management server 30 detects a record in the VM virtual HBANVWPN column 327C, which matches the WWPN included in the FCID request, as a result of the search, it recognizes the LV virtual HBAN-VWPN column 327F as the communication target WWPN. On the other hand, if the management server 30 detects a record in the LV virtual HBANVWPN column 327F, which matches the WWPN included in the FCID request as a result of the search, it recognizes the VM virtual HBANVWPN column 327C as the communication target WWPN. Then, the management server 30 searches the WWPN column 328B of the FCID assignment table 328 by using the communication target WWPN as a key.

The management server 30 judges whether or not an FCID has been issued to the virtual HBA which is the communication target, by searching the FCID column 328C of the FCID assignment table 328 (S75).

Then, if a negative result is obtained in this judgment, the management server 30 proceeds to step S78. On the other hand, if an affirmative result is obtained in this judgment, the management server 30 identifies two network devices identified by two FDF switch IDs based on the FDF switch ID stored in the FDF switch ID column 328A of the record including the matching FCID found as a result of the search and the FDF switch ID included in the FCID request and further judges whether or not paths between these two network devices are routed through the ECMP network, by referring to the network topology table 323 (see FIG. 6) and the distribution information table 3251 (see FIG. 16) (S76).

If a negative result is obtained in this judgment, the management server 30 proceeds to step S78. On the other hand, if an affirmative result is obtained in this judgment, the management server 30 refers to the FCID assignment table 328 and searches a list of assigned FCID addresses. Furthermore, the management server 30 refers to the network topology table 323 and decides one or more links (hereinafter referred to as the "FCoE communication candidate link") which form a path of the smallest link traffic volume (for example, an average value of the average transmission amount and the average reception amount) from among the ECMP paths between the network devices identified by the two FDF switch IDs. Then, the management server 30 selects one smallest value, other than the already assigned values, in ascending order from the range of predetermined assignable FCIDs (for example, from "00:00:01" to "00:FF:FF"). The selected value will be hereinafter referred to as the "candidate FCID to be assigned."

Incidentally, the above-mentioned range of assignable FCIDs may be decided, for example, as a unique range for each FDF switch so that it will be used as routing information about FCoE packets between the FDF switches.

Then, the management server 30 calculates the FCID of the FCID column 328C, which is included in the record searched in step S85, and a communication path to the candidate FCID to be assigned by the same method as the path decision procedures explained in the aforementioned first embodiment and calculates a link through which the FCID is routed. Then, finally, the management server 30 compares the link with the FCoE communication candidate link; and if they correspond to each other, the management server 30 decides the candidate FCID to be assigned as the FCID to be assigned; and if they do not correspond to each other, the management server 30 selects one second smallest value, which is not any assigned FCID, in ascending order, repeats the same processing, and decides the FCID to be assigned (S77).

On the other hand, if it is unnecessary to calculate the FCID routed through a certain link, the management server 30 decides an arbitrary FCID, which is not any already assigned FCID, from the range of assignable FCIDs to be the FCID to be assigned (S78).

The management server 30 registers the FCID to be assigned, which were decided in step S77 or S78, and the FDF switch ID and WWPN, which are included in the FCID request, in the FCID assignment table 328, thereby updating the FCID assignment table 328 (S79).

Next, the management server 30 sends the FCID to be assigned to the management switch SW (S80).

After receiving the FCID to be assigned from the management server 30, the management switch SW registers the FDF switch ID, the WWPN, and the FCID in the FCID assignment table 328 retained in the management switch SW and then sends this FCID to be assigned and the FC-MAP, which the FCF function has, to the rack installation switch 21 (S81).

After receiving the FCID to be assigned and the FC-MAP from the management switch SW, the rack installation switch 21 further sends the FCID and the FC-MAP to the virtual HBA which is the requestor (S82).

After receiving the FCID and the FC-MAP from the rack installation switch 21, the virtual HBA creates an FPMA based on the FCID and the FC-MAP and performs FCoE packet communication by using the FPMA and the FCID (S83).

(5-4) Advantageous Effects of this Embodiment

According to this embodiment as described above when performing communication in the multipath environment, particularly between the server 22 and/or the virtual server and the storage apparatus 23, according to the already known FCoE protocol, it is possible to improve usage efficiency by balancing a communication load in the network by assigning an optimum FCID to an HBA and/or a virtual HBA of the virtual machine 221 or the LV 231.

(6) Other Embodiments

According to another embodiment, a network management apparatus which is not shown in the drawings, instead of the management server 30, may be connected to and comprised in the management network N or the management switch SW. In this case, the network management apparatus executes each of the aforementioned processing in FIG. 9, FIG. 11, FIG. 13, FIG. 14, and FIG. 19 on any of the relay switch 10, the rack installation switch 21, the virtual machine 221, the virtual machine execution module 222, the distribution communication middleware 2215, or the management terminal 40 via the management network N or the management switch SW.

Moreover, the physical configuration management module 311, the virtual machine management module 312, the network management module 313, and the statistic information management module 314 included in this network management apparatus may be implemented by the control part which is not illustrated in the drawings. In this case, the control part comprises, for example, the CPU 11 and the memory 12 and controls the operation of each part of the network management apparatus in an integrated manner.

Furthermore, this network management apparatus may store the configuration information table 321, the virtual machine information table 322, the network topology table 323, the statistic information table 324, the distribution information table 325, the virtual machine operation information table 326, the volume allocation table 327, and the FCID assignment table 328 in the memory 12 or the external storage device 13 or may acquire and input them from the acquisition part of, for example, the communication device 14 (see FIG. 2).

INDUSTRIAL APPLICABILITY

The present invention can be applied to a wide variety of network management apparatuses with various configurations equipped with the packet transfer path control function.

REFERENCE SIGNS LIST 10 relay switch, 11 CPU, 12 memory, 13 external storage device, 14 communication device, 15 output device, 16 input device, 17 reading/writing device, 20 rack, 21 rack installation switch, 211 to 217 physical ports, 218 logical port, 22 server, 221 virtual machine, 2211 to 2213 virtual NICs, 2214 application, 2215 distribution communication middleware, 222 virtual machine execution module, 23 storage apparatus, 231 LV, 30 management server, 321 configuration information table, 322 virtual machine information table, 323 network topology table, 324 statistic information table, 325 distribution information table, 326 virtual machine operation information table, 327 volume allocation table, 328 FCID assignment table, 40 management terminal, N management network, SW management switch.

The invention claimed is:

1. A network management apparatus in a network of a multipath configured for communication between servers, between storage apparatuses, or between a server and a storage apparatus, the network management apparatus provided for controlling a packet transfer path when transferring a packet to a virtual machine operating in the server or a logical volume operating in the storage apparatus by using the multipath,
wherein the network management apparatus comprises:
a management server configured to acquire network configuration information to manage a status of use of the network and statistic information to manage statistic information about packets flowing over the network; and
a controller comprising at least a processor and a memory, the controller being configured to reassign an existing address, which is already assigned to the virtual machine or the logical volume, based on the network configuration information and the statistic information acquired by the management server,
wherein when reassigning the existing address, the controller extracts a link with the largest link cost from among links comprising the network based on the network configuration information and identifies a flow routed though the extracted link based on the statistic information; when receiving a path change request and a via link request to request a via link with respect to the specified flow from an external terminal, the controller selects either one of addresses of an address pair of the specified flow as a change target address; and when changing the selected change target address, the controller changes the change target address to a candidate address to be assigned by selecting an address, which is routed through a link included in the via link request and has not been assigned, as the candidate address to be assigned.

2. A network management apparatus according to claim 1, wherein when selecting either one of the addresses of the address pair of the specified flow as the change target address, the controller selects an address assigned to a network interface implemented by software as the change target address.

3. A network management apparatus according to claim 1, wherein if either one of the addresses of the address pair of the specified flow is an address assigned to a network interface implemented by software when selecting either one of the addresses of the address pair of the specified flow as the change target address, the controller selects an address, which is managed more often by the statistic information, from the address pair of the specified flow as the change target address.

4. A network management apparatus according to claim 1, wherein the management server acquires virtual machine operation information to manage an operational status of the virtual machine, and
wherein when a new additional virtual machine which is a duplicate of the virtual machine is to be newly added to the server and a new address is assigned to the new additional virtual machine, the controller extracts communication property of the virtual machine, which is a duplicate source, based on the virtual machine operation information acquired from the management server, estimates communication property of the new additional virtual machine based on the extracted communication property of the virtual machine, and assigns a new address to the new additional virtual machine based on the estimated communication property, the network configuration information, and the statistic information.

5. A network management apparatus according to claim 1, wherein after receiving a packet distribution transfer request from the server administrator or the external terminal, the controller calculates the number of paths for the multipath, calculates unassigned addresses, which are as many as the calculated number of paths and routed through different paths respectively, based on the network configuration information and the statistic information, and assigns the calculated addresses to the virtual machine.

6. A network management apparatus according to claim 1,
wherein the network configuration information includes information about a link between a source switch and a destination switch,
wherein the statistic information includes information about a source address and a destination address corresponding to the information about the link, and
wherein when a failure occurs at a link between the servers, between the storage apparatuses, or between the server and the storage apparatus, the controller identifies a flow and device affected by the failure based on the network configuration information and the statistic information.

7. A network management apparatus according to claim 1,
wherein the controller makes a fiber channel identification (FCID) according to a fiber channel over Ethernet protocol (FCoE) included in an address to be assigned to the virtual machine and/or the logical volume and assigns the FCID to a fiber channel communication interface for the virtual machine and/or the logical volume.

8. A network management method for a network management apparatus in a network of a multipath configured for communication between servers, between storage apparatuses, or between a server and a storage apparatus, the network management apparatus provided for controlling a packet transfer path when transferring a packet to a virtual machine operating in the server or a logical volume operating in the storage apparatus by using the multipath,
wherein the network management apparatus comprises:
a management server configured to acquire network configuration information to manage a status of use of the network and statistic information to manage statistic information about packets flowing over the network; and
a controller comprising at least a processor and a memory, the controller being configured to reassign an existing address, which is already assigned to the virtual machine or the logical volume, based on the network configuration information and the statistic information acquired by the management server,
wherein the network management method comprises:
a first step executed, when reassigning the existing address, by the controller of extracting a link with the largest link cost from among links comprising the network based on the network configuration information;
a second step executed by the controller of identifying a flow routed though the extracted link based on the statistic information;
a third step executed, when receiving a path change request and a via link request to request a via link with respect to the specified flow from an external terminal, by the controller of selecting either one of addresses of an address pair of the specified flow as a change target address;
a fourth step executed, when changing the selected change target address, by the controller of selecting an address, which is routed through a link included in the via link request and has not been assigned, as a candidate address to be assigned; and
a fifth step executed by the controller of changing the change target address to the candidate address to be assigned.

9. A network management method according to claim 8,
wherein in the third step when selecting either one of the addresses of the address pair of the specified flow as the change target address, the controller selects an address assigned to a network interface implemented by software as the change target address.

10. A network management method according to claim 8,
wherein in the third step, if either one of the addresses of the address pair of the specified flow is an address assigned to a network interface implemented by software when selecting either one of the addresses of the address pair of the specified flow as the change target address, the controller selects an address, which is managed more often by the statistic information, from the address pair of the specified flow as the change target address.

11. A network management method according to claim 8, further comprising:
a sixth step executed by the management server of acquiring virtual machine operation information to manage an operational status of the virtual machine; and
an seventh step executed, when newly adding a new additional virtual machine which is a duplicate of the virtual machine to the server and assigning a new address to the new additional virtual machine, by the controller of extracting communication property of the virtual machine, which is a duplicate source, based on the virtual machine operation information acquired from the management server, estimating communication property of the new additional virtual machine based on the extracted communication property of the virtual machine, and assigning a new address to the new additional virtual machine based on the estimated communication property, the network configuration information, and the statistic information.

12. A network management method according to claim 8, further comprising a ninth step executed, after receiving a packet distribution transfer request from the server administrator or the external terminal, by the controller of calculating the number of paths for the multipath, calculating unassigned addresses, which are as many as the calculated number of paths and routed through different paths respectively, based on the network configuration information and the statistic information, and assigning the calculated addresses to the virtual machine.

13. A network management method according to claim 8,
wherein the network configuration information includes information about a link between a source switch and a destination switch,
wherein the statistic information includes information about a source address and a destination address corresponding to the information about the link, and
wherein the network management method further comprises a ninth step executed, when a failure occurs at a link between the servers, between the storage apparatuses, or between the server and the storage apparatus, by the controller of identifying a flow and device affected by the failure based on the network configuration information and the statistic information.

14. A network management method according to claim 8, further comprising a tenth step executed by the controller of making a fiber channel identification (FCID) according to a fiber channel over Ethernet protocol (FCoE) included in an address to be assigned to the virtual machine and/or the logical volume and assigning the FCID to a fiber channel communication interface for the virtual machine and/or the logical volume.

15. A network management system in a network of a multipath configured for communication between servers, between storage apparatuses, or between a server and a storage apparatus, the network management system provided for controlling a packet transfer path when transferring a packet to a virtual machine operating in the server or a logical volume operating in the storage apparatus by using the multipath, wherein the network management system comprises:
acquisition means for acquiring network configuration information to manage a status of use of the network and statistic information to manage statistic information about packets flowing over the network; and
control means for reassigning an existing address, which is already assigned to the virtual machine or the logical volume, based on the network configuration information and the statistic information acquired by the acquisition means,
wherein when reassigning the existing address, the control means extracts a link with the largest link cost from among links comprising the network based on the network configuration information and identifies a flow routed though the extracted link based on the statistic information; when receiving a path change request and a via link request to request a via link with respect to the specified flow from an external terminal, the control means selects either one of addresses of an address pair of the specified flow as a change target address; and when changing the selected change target address, the control means changes the change target address to a candidate address to be assigned by selecting an address, which is routed through a link included in the via link request and has not been assigned, as the candidate address to be assigned.

* * * * *